US010972144B2

(12) United States Patent
January et al.

(10) Patent No.: US 10,972,144 B2
(45) Date of Patent: Apr. 6, 2021

(54) COMMUNICATION SYSTEMS WITH BODY WORN PLATE DESIGN

(71) Applicant: Harris Global Communications, Inc., Rochester, NY (US)

(72) Inventors: Michael W. January, Fayetteville, NC (US); Richard Furness, Kent, NY (US); Cory N. Fitzsimmons, Avon, NY (US); Daniel J. Harris, Rochester, NY (US)

(73) Assignee: HARRIS GLOBAL COMMUNICATIONS, INC., Rochester, NY (US)

( * ) Notice: Subject to any disclaimer, the term of this patent is extended or adjusted under 35 U.S.C. 154(b) by 0 days.

(21) Appl. No.: 16/204,145

(22) Filed: Nov. 29, 2018

(65) Prior Publication Data
US 2020/0177222 A1 Jun. 4, 2020

(51) Int. Cl.
*H04B 1/3827* (2015.01)
*G06F 1/16* (2006.01)
*A41D 1/00* (2018.01)
*A41D 13/00* (2006.01)
*F41H 1/02* (2006.01)

(52) U.S. Cl.
CPC .......... *H04B 1/385* (2013.01); *A41D 1/005* (2013.01); *A41D 13/0012* (2013.01); *F41H 1/02* (2013.01); *G06F 1/163* (2013.01); *H04B 2001/3855* (2013.01)

(58) Field of Classification Search
CPC ........ A41D 1/005; G06F 1/163; H04B 1/385; F41H 5/04
See application file for complete search history.

(56) References Cited

U.S. PATENT DOCUMENTS

| 3,868,573 | A | 2/1975 | Holcomb et al. |
| 5,884,198 | A | 3/1999 | Kese et al. |
| 7,424,316 | B1 | 9/2008 | Boyle |
| D643,400 | S | 8/2011 | Wahl et al. |
| 10,439,322 | B1 * | 10/2019 | Miller ............ H01R 13/62 |
| 2009/0027229 | A1 | 1/2009 | Fortson et al. |
| 2012/0153740 | A1 * | 6/2012 | Soar ............ F41H 1/02 307/104 |

(Continued)

FOREIGN PATENT DOCUMENTS

| EP | 1249751 A2 | 10/2002 |
| WO | 2010138704 A1 | 12/2010 |

OTHER PUBLICATIONS

European Search Report dated Feb. 5, 2020 in European Application No. 19205680.2.

*Primary Examiner* — Muthuswamy G Manoharan
(74) *Attorney, Agent, or Firm* — Fox Rothschild LLP; Robert J. Sacco; Carol E. Thorstad-Forsyth

(57) ABSTRACT

Systems and methods for operating a communication device. The methods comprise: concealing the communication device and/or at least one cable in a ballistic wearable item (e.g., a ballistic vest) such that the communication device resides in a storage slot for a trauma plate, where the communication device comprises a frame having a cross-sectional profile that matches a cross-sectional profile of the trauma plate by a given amount (e.g., 75-100%); and performing communication operations by a radio module integrated with the frame of the communication device.

45 Claims, 25 Drawing Sheets

(56) References Cited

U.S. PATENT DOCUMENTS

| | | | |
|---|---|---|---|
| 2012/0266352 A1* | 10/2012 | Busch | F16B 21/09 2/102 |
| 2014/0230638 A1* | 8/2014 | Waldrop | F41H 5/0492 89/36.02 |
| 2016/0033235 A1* | 2/2016 | Kinnings | F41H 1/02 2/102 |
| 2016/0178326 A1* | 6/2016 | Strauss | F41H 5/04 89/36.02 |
| 2016/0233695 A1* | 8/2016 | Hopfer, III | H01M 2/1066 |
| 2018/0005503 A1* | 1/2018 | Kaindl | G08G 1/166 |
| 2018/0142924 A1* | 5/2018 | Limon | A41D 13/0025 |
| 2019/0056204 A1* | 2/2019 | Field | B32B 3/08 |
| 2019/0321217 A1* | 10/2019 | Taylor | C08K 3/08 |

\* cited by examiner

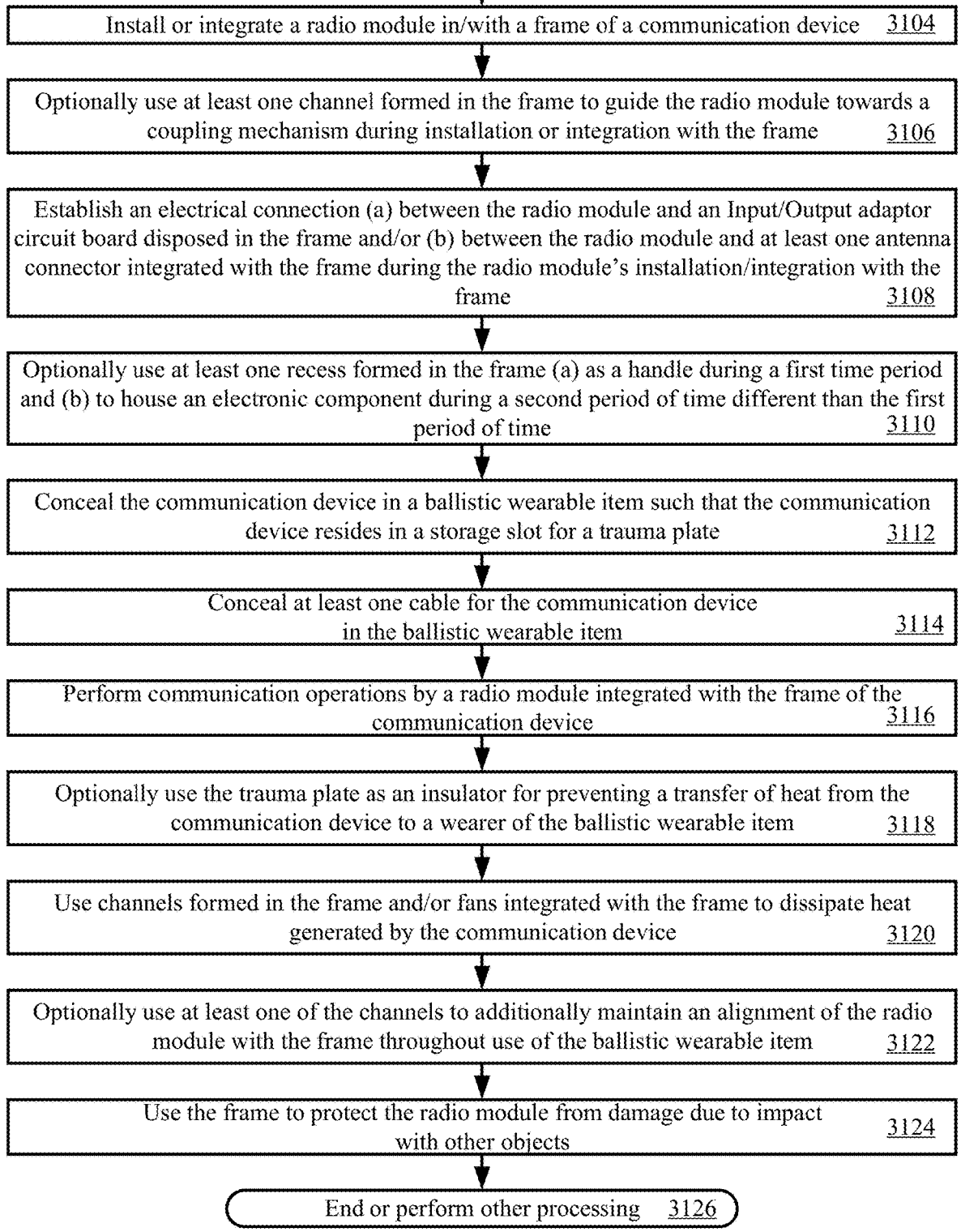

COMMUNICATION SYSTEMS WITH BODY WORN PLATE DESIGN

BACKGROUND

Statement of the Technical Field

The present disclosure relates generally to communication systems. More particularly, the present disclosure relates to communication systems with a body worn plate design.

Description of the Related Art

Wearable communication devices exist today, and are used in various applications (such as military applications). Such devices include radios which are worn as part of user gear (e.g., as items attached to or partially inserted in backpacks). These radios require cabling for connecting the same to handheld speaker/microphone units and/or batteries. This cabling runs outside of the user gear, and therefore has the potential of being snagged or caught on a projection (e.g., a tree limb). In effect, the user of the wearable radio can be injured and/or the radio itself can be damaged.

SUMMARY

The present disclosure concerns implementing systems and methods for operating a communication device. The methods comprise: concealing the communication device and/or at least one cable in a ballistic wearable item (e.g., a ballistic vest) such that the communication device resides in a storage slot for a trauma plate, where the communication device comprises a frame having a cross-sectional profile that matches a cross-sectional profile of the trauma plate by a given amount (e.g., 75-100%); and performing communication operations by a radio module integrated with the frame of the communication device.

In some scenarios, the communication device has a dual purpose of (a) providing protection to a wearer from blunt trauma resulting from an object's impact with the ballistic wearable item and (b) providing wireless communication capabilities to the wearer. In this case, the trauma plate may be replaced by the communication device.

In other scenarios, the communication device resides in the storage slot adjacent to the trauma plate. The trauma plate is used as an insulator for preventing a transfer of heat from the communication device to a wearer of the ballistic wearable item.

In those or other scenarios, the methods involve: using channels formed in the frame to dissipate heat generated by the communication device; using at least one of the channels to additionally maintain an alignment of the radio module with the frame throughout use of the ballistic wearable item; and/or using at least one of the channels to additionally guide the radio module towards a coupling mechanism during installation or integration with the frame. The coupling mechanism may comprise convex protrusions formed on a surface of the radio module which engage concave depressions formed in the at least one channel.

Additionally or alternatively, the frame is used to protect the radio module from damage due to impact with other objects. The frame comprises a raised portion that surround at least three sides of the radio module. The raised portion comprises a top surface that resides above or is aligned with a top surface of the radio module.

In those or yet other scenarios, the methods further comprise: establishing an electrical connection between the radio module and an Input/Output adaptor circuit board disposed in the frame; establishing an electrical connection between the radio module and at least one antenna connector integrated with the frame; using at least one recess formed in the frame (a) as a handle during a first time period and (b) to house an electronic component (e.g., a battery) during a second period of time different than the first period of time; and/or using at least one fan integrated with the frame to prevent heat transfer from the communication device to the wearer.

BRIEF DESCRIPTION OF THE DRAWINGS

The present solution will be described with reference to the following drawing figures, in which like numerals represent like items throughout the figures.

FIG. 31 is a flow diagram of an illustrative method for using a communication device.

DETAILED DESCRIPTION

Figure 1:
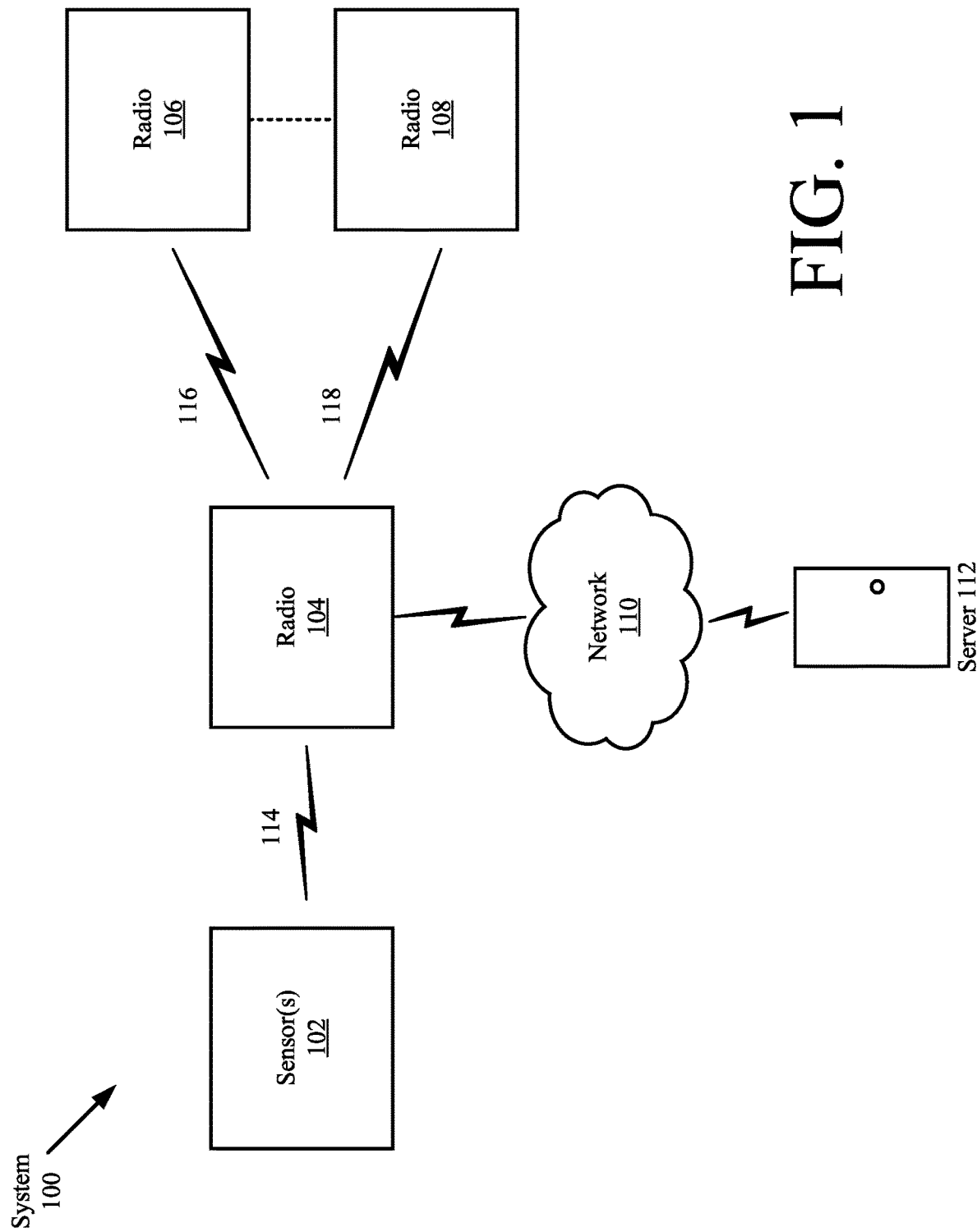
FIG. 1 is an illustration of an illustrative system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

As noted above, wearable communication devices exist today, and are used in various applications (such as military applications). Such devices include radios which are worn as part of user gear (e.g., as items attached to or partially inserted in backpacks or vests). These radios require cabling for connecting the same to handheld speaker/microphone units and/or batteries. This cabling runs outside of the user gear, and therefore has the potential of being snagged or caught on a projection (e.g., a tree limb). In effect, the user of the wearable radio can be injured and/or the radio itself can be damaged.

The present solution provides a way to overcome this drawback of conventional wearable communication devices. The solution involves providing a communication device with a form factor that can be completely concealed within a vest, backpack or other wearable item. This novel form factor allows users of the present solution to negotiate walls and obstacles without the risk of injury or equipment damage. The novel form factor of the present solution also allows flexibility to incorporate a self-contained battery option, to add fans, to integrate sensors, to customize the device, and/or to minimize the total number of cables needed for the device.

The present solution can be used in a plurality of applications. These applications include, but are not limited to, military applications, emergency personnel applications, security applications, extreme sport applications, scuba diving applications, and/or other applications in which vests (e.g., ballistic vests) and/or gear packs (e.g., backpacks) should be worn.

In ballistic vest scenarios, a trauma plate is provided therewith. The trauma plates primary purpose is to absorb and disrupt kinetic energy of a bullet impact and reduce the blunt trauma transferred to the wearer of the ballistic vest. Ballistic plates are becoming thinner thereby providing additional space within the ballistic vest for other equipment. This additional space is used herein for holding the present solution such that the same is housed and/or concealed within the ballistic vest. Additionally, some or all of the cabling for the present solution will also be housed and/or concealed within the ballistic vest. The present solution will be removable from the ballistic vest such that it can be upgraded and/or subject to maintenance at a depot level.

Referring now to FIG. 1, there is provided an illustration of an illustrative system 100. System 100 comprises sensor(s) 102, radios 104, 106, . . . , 108, a network 110, and a sever 112. The sensor(s) 102 are generally configured to collect information useful for determining and/or tracking a wearer's condition (e.g., physical and/or emotional states) and/or conditions of a surrounding environment. Accordingly, the sensor(s) 102 include, but are not limited to, night vision goggles, biometric sensors, fluid level sensors (e.g., in a water bottle), a Global Positioning System ("GPS"), microphone, and/or motion sensors. Each of the listed sensors is well known in the art, and therefore will not be described herein. The sensors are configured to communicate with radio 104 (e.g., via a wireless or wired link). For example, the sensor(s) 102 communicate sensor data to the radio 104 via a wireless communication link 114. The radio 104 then communicates the sensor data to other radios 106, . . . , 108 via wireless communication links 116, 118 and/or a remote server 112 via network 110 (e.g., the Internet).

Figure 2:
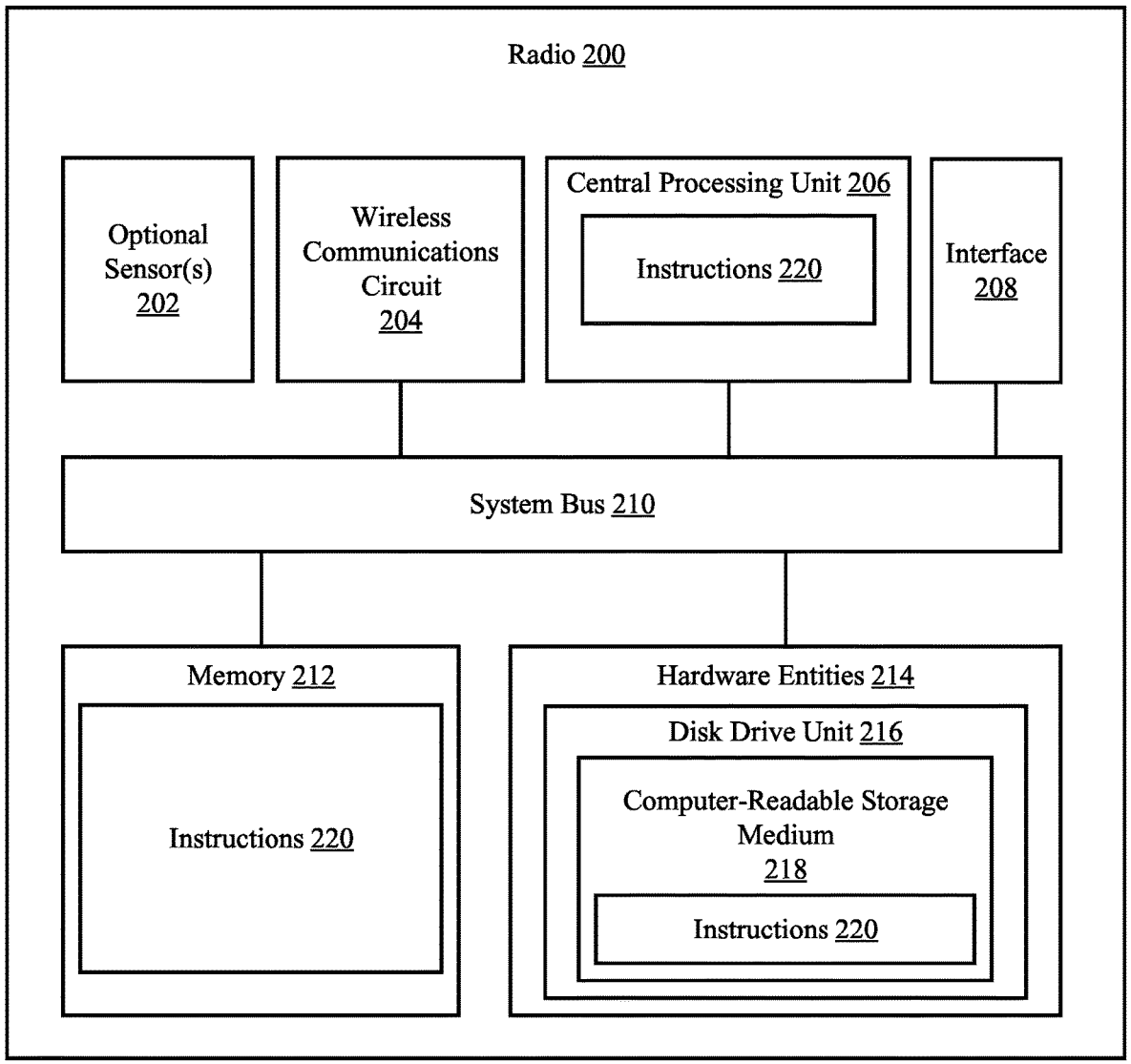
FIG. 2 is a block diagram of an illustrative radio.

A more detailed diagram of a radio 200 is provided in FIG. 2. Radios 104, 106, . . . , 108 can be the same as or substantially similar to radio 200. As such, the discussion of radio 200 is sufficient for understanding radios 104, 106, . . . , 108 of FIG. 1.

Radio 200 may include more or less components than those shown in FIG. 2. However, the components shown are sufficient to disclose an illustrative solution implementing the present invention. The hardware architecture of FIG. 2 represents one implementation of a representative radio configured to enable wireless communications to/from remote devices as described herein. As such, the radio 200 of FIG. 2 implements at least a portion of the method(s) described herein.

Some or all the components of the radio 200 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

The radio 200 is designed to act as at least one of a wireless data hub, a wired data hub, a sensor hub, an Intelligence Surveillance Reconnaissance ("ISR") receiver, a power conditioner, an audio adaptor, a Human Machine Interface ("HMI") adaptor, and/or environmental/event sensor. Accordingly, as shown in FIG. 2, the radio 200 comprises optional sensor(s) 202, a wireless communications circuit 204, a Central Processing Unit ("CPU") 206, an interface 208, a system bus 210, a memory 212 connected to and accessible by other portions of radio 200 through system bus 210, and hardware entities 214 connected to system bus 210.

The sensor(s) 202 can include, but are not limited to, biometric sensors, a GPS sensor, a microphone, and/or a motion sensor. The wireless communications circuit 204 is configured to facilitate wireless communications with external devices. In this regard, circuit 204 comprises a transceiver. Transceivers are well known in the art, and therefore will not be described herein. Any known or to be known transceiver can be used herein without limitation. In some scenarios, the transceiver is an RF transceiver. The interface 208 provides a means for electrically connecting the radio 200 to Input/Output ("I/O") circuits and antennas. The I/O circuits can include, but are not limited to, an audio circuit, a data/control circuit, and/or a power supply circuit (e.g., a battery or battery charger).

At least some of the hardware entities 214 perform actions involving access to and use of memory 212, which can be a Random Access Memory ("RAM"), and/or a disk driver. Hardware entities 214 can include a disk drive unit 216 comprising a computer-readable storage medium 218 on which is stored one or more sets of instructions 220 (e.g., software code) configured to implement one or more of the methodologies, procedures, or functions described herein. The instructions 220 can also reside, completely or at least partially, within the memory 212 and/or within the CPU 206 during execution thereof by the radio 200. The memory 212 and the CPU 206 also can constitute machine-readable media. The term "machine-readable media", as used here, refers to a single medium or multiple media (e.g., a centralized or distributed database, and/or associated caches and servers) that store the one or more sets of instructions 220. The term "machine-readable media", as used here, also refers to any medium that is capable of storing, encoding or carrying a set of instructions 220 for execution by the radio 200 and that cause the radio 200 to perform any one or more of the methodologies of the present disclosure.

The radio 200 is designed to be concealed within a vest, backpack or other wearable item. The vest can include a ballistic vest, and the backpack can include a ballistic backpack. An illustrative ballistic vest 200 in which the radio can be concealed is shown in FIG. 3.

Figure 3:
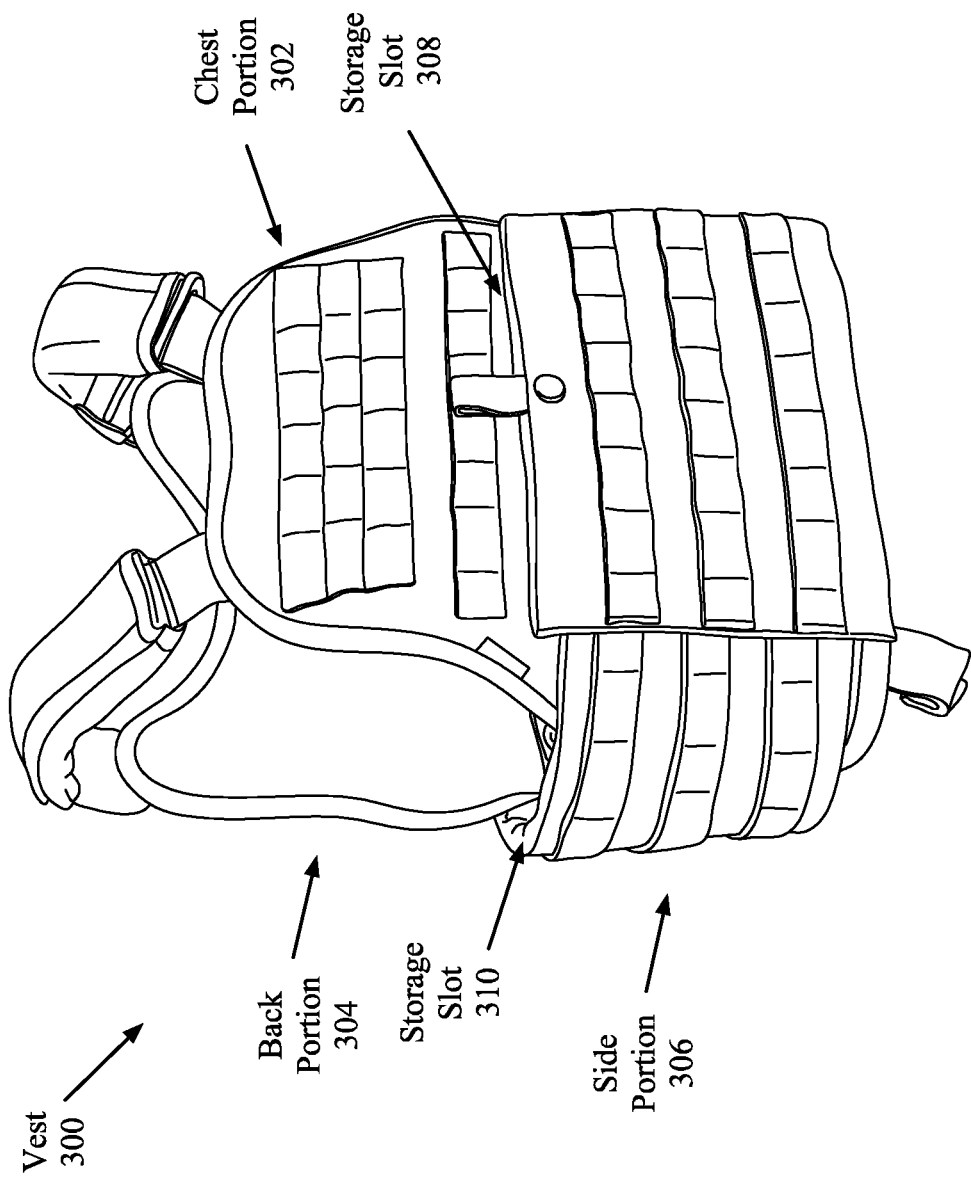
FIG. 3 is an illustration of an illustrative vest including ballistic plates.

Referring now to FIG. 3, there is provided an illustration of an illustrative vest 300 that can be worn by an individual. The vest 300 has at least two purposes: (1) provide protection to wearers from blunt trauma resulting from objects (e.g., bullets) impact with the vest; and (2) provide a vest with an integrated communication device. In this regard, it should be understood that the vest 300 includes a plurality of internal trauma plates (not visible in FIG. 3). For example, a first trauma plate is disposed in a storage slot 308 provided in a chest portion 302 of the vest. A second trauma plate is disposed in a storage slot (not visible in FIG. 3) provided in a back portion 304 of the vest. Third and fourth trauma plates are respectively disposed in storage slots 310 provided in side portions 306 of the vest. The present solution is not limited to the particulars of this example. Any number of trauma plates can be provided with the vest in accordance with a given application.

Trauma plates are known in the art, and therefore will not be described or shown herein. Any known or to be known trauma plate can be used herein. For example, the trauma plated includes a lightweight curved trauma plate available from Darkhorse Armor of the United States of America. Still, it should be noted that the trauma plates are relatively thin, and designed to fit snuggly within storage slots of the vest such that their positions relative to wearer bodies remains substantially the same when in use. As such, the vest's storage slots for the trauma plates are now able to additionally house one or more communication devices therein. For example, a communication device is inserted into the storage slot 308, 310 of the chest portion 302, back portion 304 and/or side portion(s) 306 of the vest 300 so as to reside adjacent to and/or be in direct contact with the trauma plate(s). In this way, the communication device(s) and associated cabling can be concealed inside the vest from onlookers.

The communication device is designed to have a cross-sectional profile that matches the cross-sectional profile of a respective trauma plate and/or storage slot by a certain amount (e.g., 75-100%). This design ensures that the communication device is maintained in a given position relative to the trauma plate at all times while the vest is being used.

Notably, the trauma plates are typically formed of a ceramic material. As such, the trauma plates not only provide protection to the wearer from blunt trauma, but may also act as insulators for preventing the transfer of heat from the communication devices to the wearers. In order for a trauma plate to act as an insulator, it must at least be in direct contact with the communication device (which may be at least partially formed of a metal such as aluminum or magnesium). Notably, the trauma plate can reside (1) between the wearer and the communication device and/or (2) on the outside of the communication device such that the communication resides adjacent to the wearer. In option (2), the communication device can have a frame that is formed of a dielectric material on at least the portion adjacent to the wearer and formed of a metal material on at least the portion adjacent to the trauma plate. The present solution is not limited in this regard. The communication device can have a frame that is entirely formed of a dielectric material such as ceramic and plastic. In this case, the trauma plate may not act as an insulator or may be replaced by the communication device.

Referring now to FIGS. 4-11, there is provided illustrations of an illustrative communication device 400 for use with a ballistic vest (e.g., ballistic vest 300 of FIG. 3). The communication device 400 comprises a frame 402 and a radio module 404. The frame 402 is designed to fit in a storage slot (e.g., storage slot 308 of FIG. 3) provided in a chest portion (e.g., portion 302 of FIG. 3) or a back portion (e.g., portion 304 of FIG. 3) of the vest 300. The cross-sectional profile of the frame 402 matches the cross-sectional profile of a trauma plate by a certain amount (e.g., 75-100%). In the present scenario, the cross-sectional profile of the frame 402 matches that of a trauma plate except for a space 406 formed in a bottom section thereof. The purpose of the space 406 will become evident as the discussion progresses.

The radio module 404 includes a radio housed in a chassis 408. The radio is the same as or similar to the radio 200 shown in FIG. 2. As such, the discussion provided above in relation to the radio 200 is sufficient for understanding operations of the radio module 404. The chassis 408 is formed of a dielectric material (e.g., ceramic and/or plastic) and/or a metal material (e.g., aluminum or magnesium). The chassis 408 can include, but is not limited to, a container 412 with a lid 414 coupled thereto via one or more coupling mechanisms 410 (e.g., screws or weld). The container 412 is coupled to the frame 402 via one or more coupling mechanisms (e.g., screws, snaps, press fit, etc.) not visible in FIGS. 4-11. In this way, the radio module 404 is securely coupled to the frame 402.

The frame 402 provides protection to the radio module 404 from damage due to impact with other objects. In this regard, the frame 402 has a raised portion 416 that at least partially surrounds the radio module 404. For example, in some scenarios, the raised portion 416 surrounds three sides of the radio module 404. In effect, only the lid 414 and one sidewall 418 are exposed and/or accessible when the radio module 404 is coupled to the frame 402. Also, a top surface 420 of the raised portion 416 resides above or is aligned with a top surface 422 of the chassis lid 414. The chassis lid 414 may be formed of a material which will not deform when impacted by an object.

Various electronics 702 are housed within the raised portion 416. In this regard, the raised portion 416 comprises a removable cover 602 and an internal cavity 704 in which the electronics 702 are disposed. The cover 602 is removably coupled to the frame 402 via one or more coupling mechanisms 706 (e.g., screws).

The electronics 702 include, but are not limited to, I/O adaptor circuit boards, sensor(s), and/or wireless connectivity components for external sensors (e.g., sensors 202 of FIG. 2). The I/O adaptor circuit boards facilitate the electronic connection of the radio module 402 with I/O connectors 502 which are accessible to a user of the communication device 400. The I/O connectors 502 are shown as being located on a single side of the communication device 400. The present solution is not limited in this regard. The I/O connectors can reside on any side of the communication device 400, and/or different sides of the communication device 400. The I/O connectors include, but are not limited to, an audio connector 508, a data/control connector 506, and/or a power connector 504. The connectors 504-508 are known in the art, and can be of any type selected in accordance with a given application. In some scenarios, the audio connector 508 is coupled to a cable for a handheld speaker and microphone. The power connector 504 is either (1) connected to a power source external to the communication device 400 and/or (2) provides a way to couple an internal rechargeable battery of the communication device 400 to a charging unit. The rechargeable battery can reside in the internal cavity 704 of the frame 402 and/or in the chassis 408 of the radio module 404.

Antenna connectors 604, 606 are also provided with the frame 402. The antenna connectors 604, 606 provide a means to connect antennas (not shown in FIGS. 4-11) to the radio module 404. A space 406 is provided in the frame 402 for the antennas. The space 406 is sized and shaped to allow the coupling of the antennas to the frame 402 without exceeding the volume of the storage slot (e.g., storage slot 308 or 310 of FIG. 3) of the vest 300.

A plurality of channels 424 are formed on one or both sides of the frame 402. In all scenarios, the channels 424 are at least formed on the same side of the frame 402 as the raised portion 416. The channels 424 provide a means to (1) maintain an alignment of the radio module 404 with the frame 402, and/or (2) dissipate heat produced by the radio module 404. In this regard, the channels extend under the radio module 404 and travel towards the edge of the frame 402. Although seven linear channels 424 are shown in FIGS. 4-11, the present solution is not limited in this regard. Any number of channels with a variety of shapes can be provided in accordance with a particular application. Also, the channels 424 need not extend parallel to each other. For example, in other scenarios, at least two channels extend perpendicular to each other. Alternatively, the channels comprise concentric circles.

Referring now to FIGS. 12-21, there is provided an illustration of another communication device 1200 for use with a ballistic vest (e.g., ballistic vest 300 of FIG. 3). The communication device 1200 comprises a frame 1202 and a radio module 1500. The frame 1202 is designed to fit in a storage slot 308 provided in a chest portion (e.g., portion 302 of FIG. 3) or a back portion (e.g., portion 304 of FIG. 3) of the ballistic vest. The cross-sectional profile of the frame 1202 matches the cross-sectional profile of a trauma plate by a certain amount (e.g., 75-100%). In the present scenario, the cross-sectional profile of the frame 402 matches that of a trauma plate except for protrusions 1204, 1206 formed on a sidewall 1208 thereof. The protrusions 1204, 1206 are provided to assist in maintaining connections between external cables and/or antennas to the connectors 1302, 1304, 1306, as well as to protect the connectors from damage.

Figure 22:
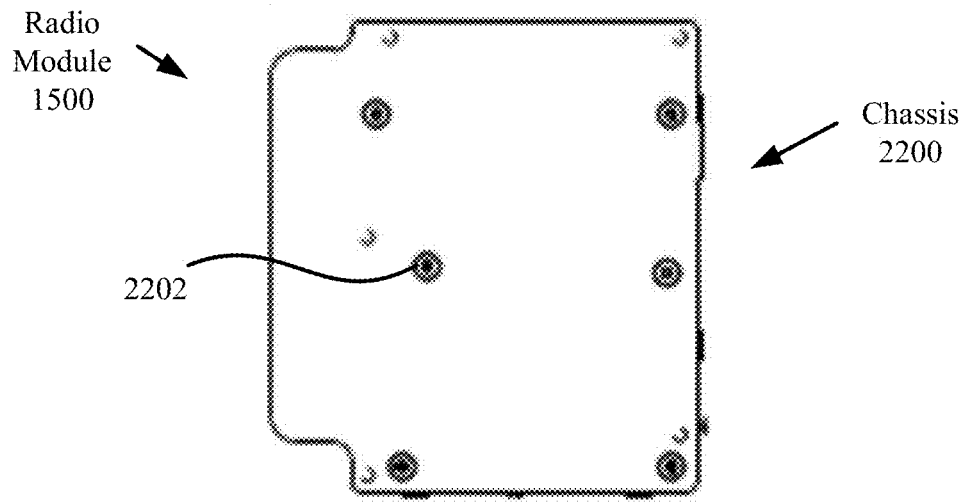
FIG. 22 is a top view of the radio module shown in FIGS. 15-17 and 19.
Figure 23:
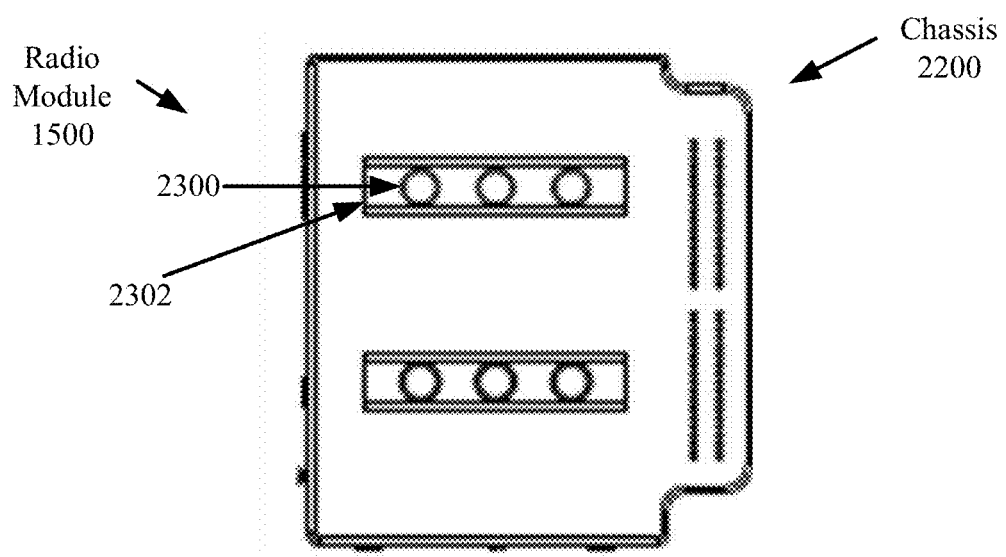
FIG. 23 is a bottom view of the radio module shown in FIGS. 15-17, 19 and 22.
Figure 24:
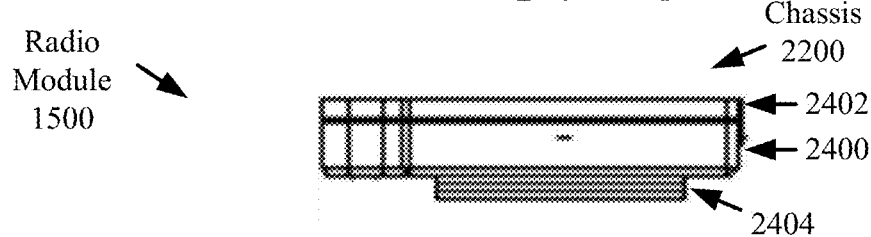
FIG. 24 is a side view of the radio module shown in FIGS. 15-17, 19, 22 and 23.

The radio module 1500 is designed to facilitate wireless communications with external devices. More detailed illustrations of the radio module 1500 are provided in FIGS. 22-24. As shown in FIGS. 22-24, the radio module 1500 includes a chassis 2200 in which a radio is disposed. The radio is the same as or similar to the radio 200 shown in FIG. 2. As such, the discussion provided above in relation to the radio 200 is sufficient for understanding operations of the radio module 1500.

Figure 15:
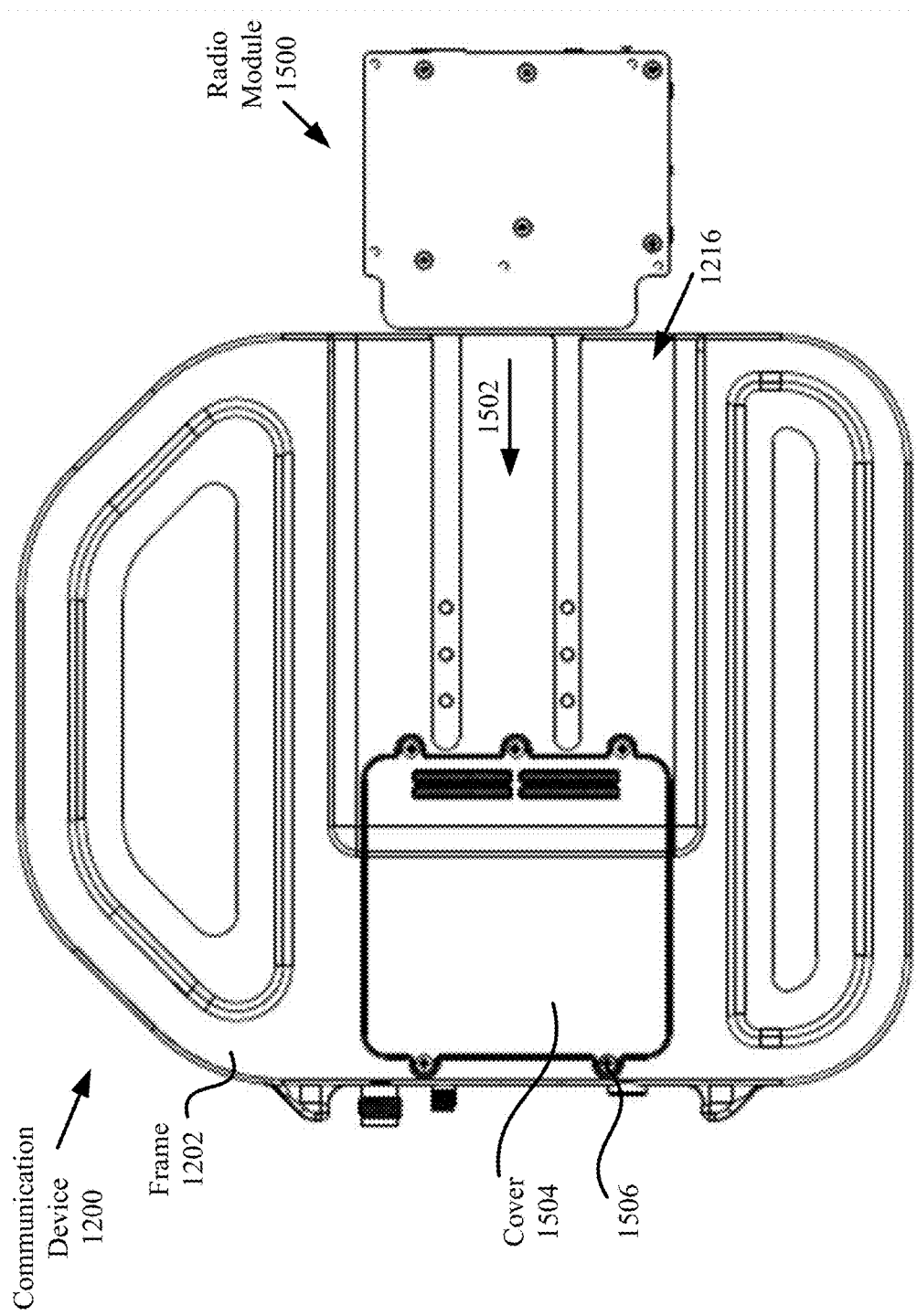
FIGS. 15-16 each provide a top view of the communication device shown in FIG. 12 with the cover coupled thereto and a radio module being installed thereon.
Figure 16:
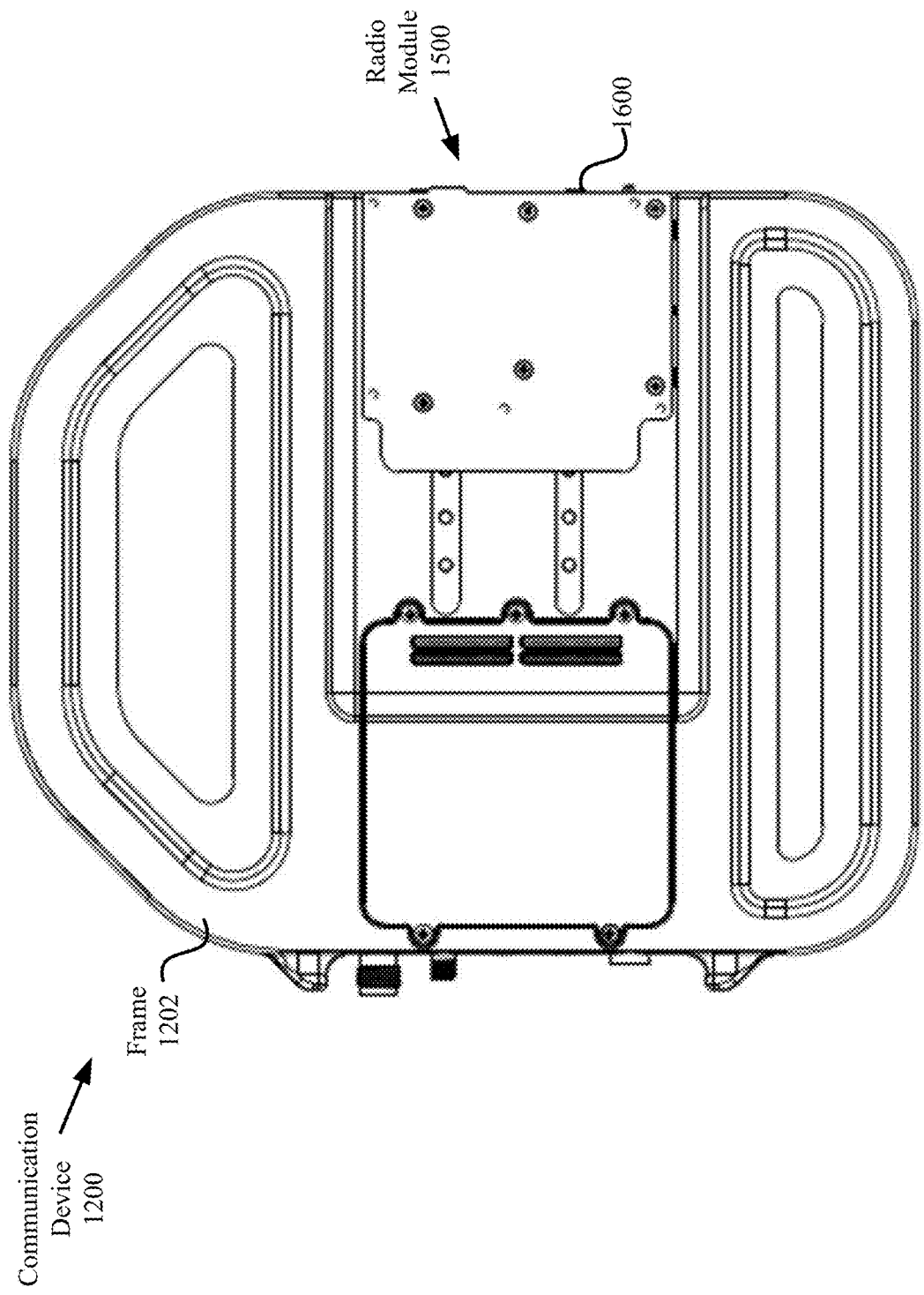
Figure 17:
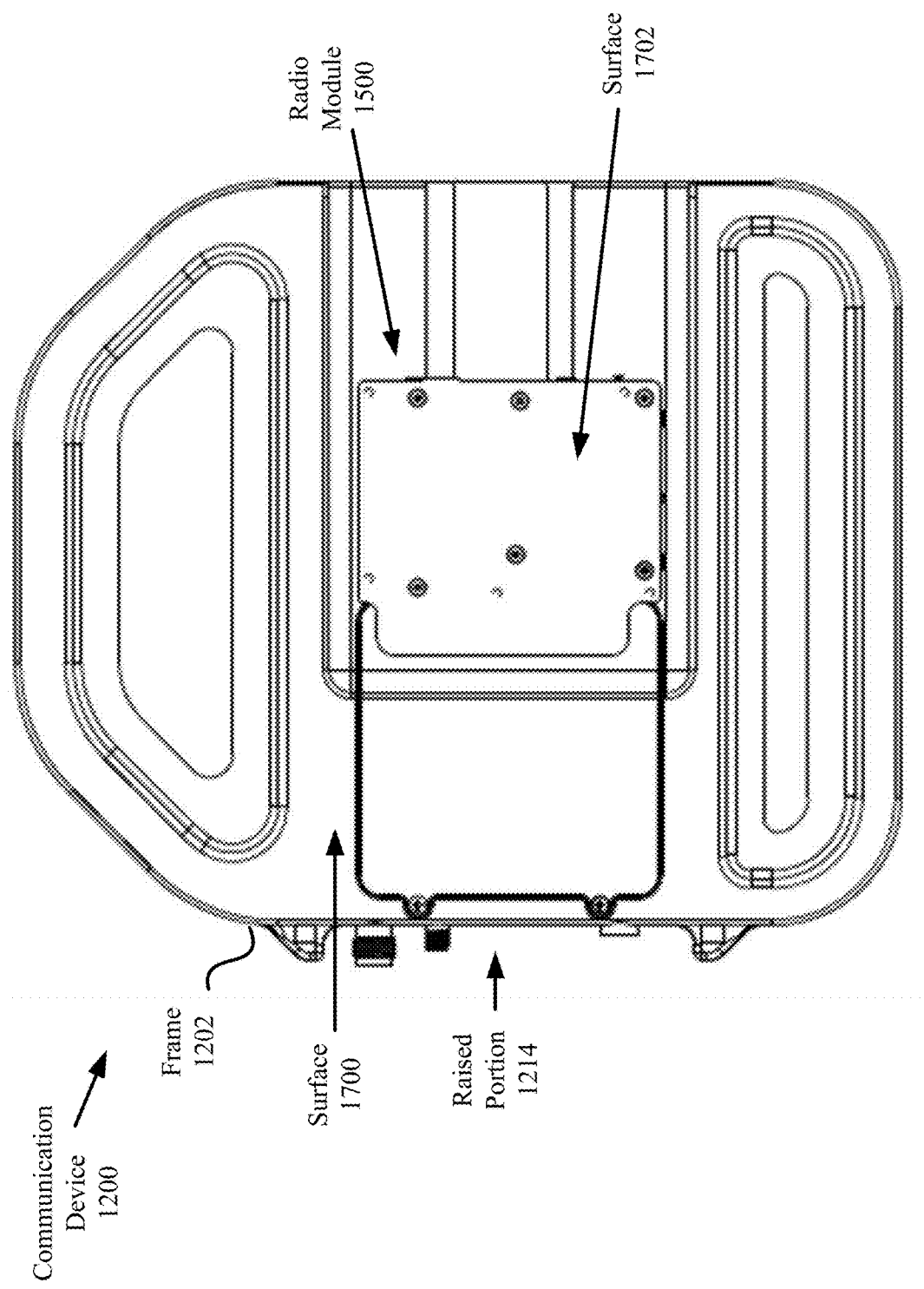
FIG. 17 is a top view of the communication device shown in FIG. 12 with the cover coupled thereto and a radio module installed thereon.
Figure 18:
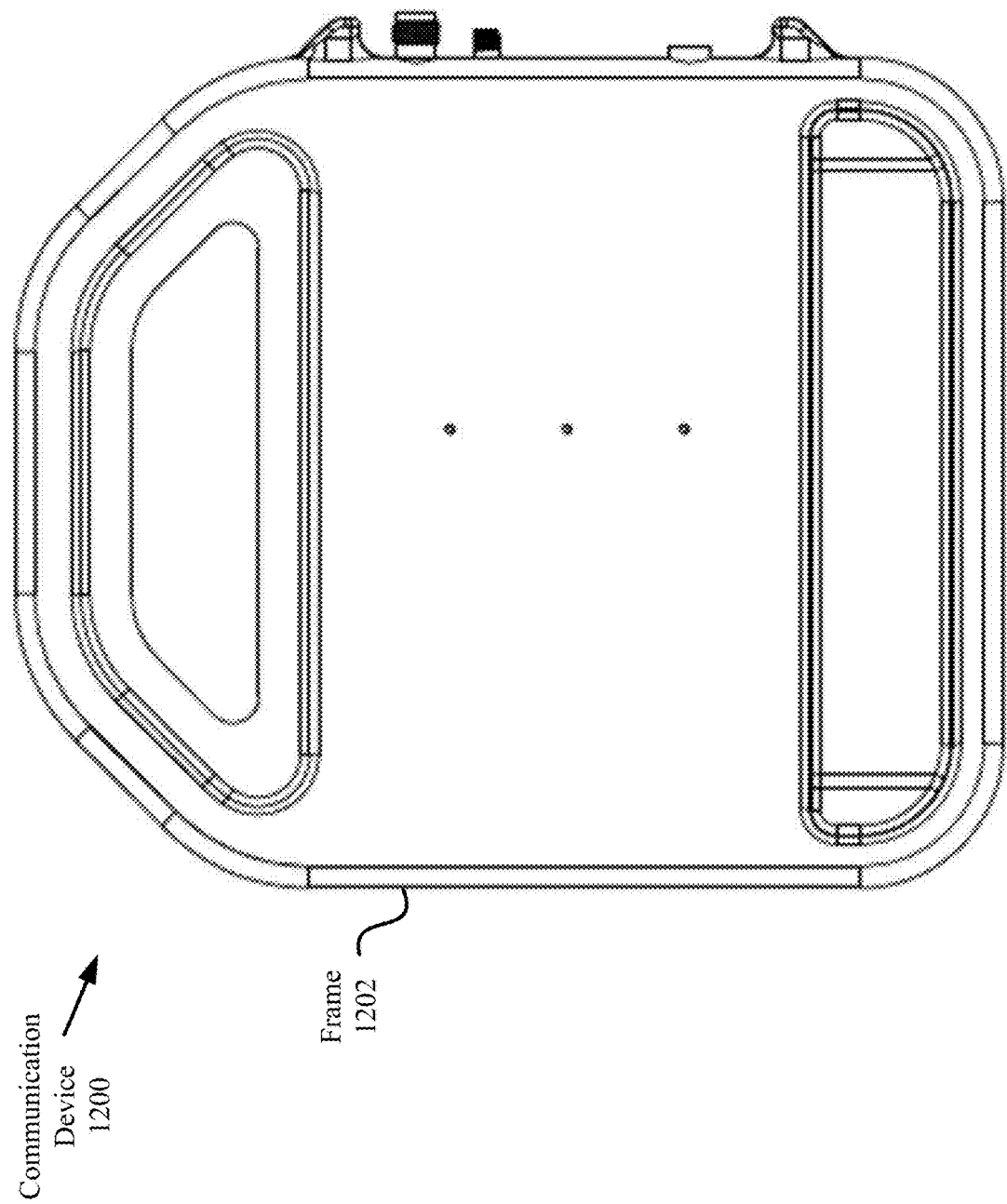
FIG. 18 a back view of the communication device shown in FIG. 12.
Figure 19:
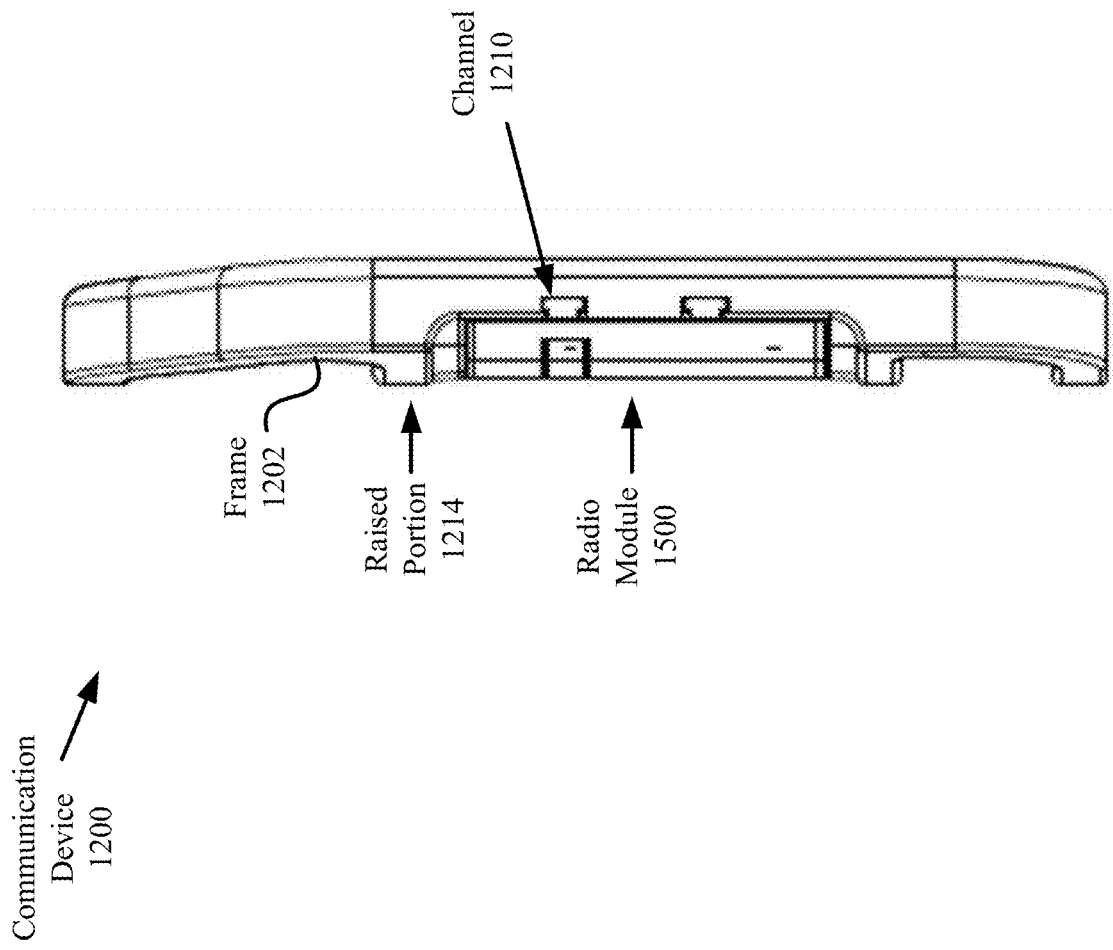
FIG. 19-21 each provide a side view of the communication device shown in FIG. 12.
Figure 20:
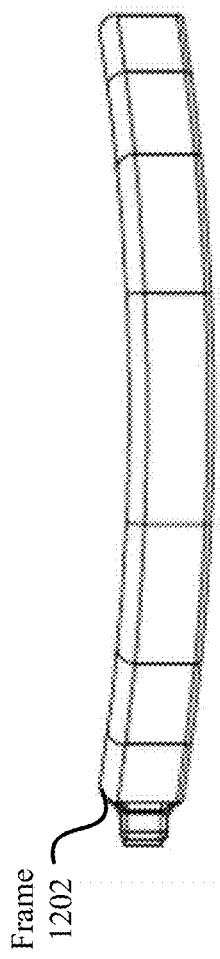
Figure 21:
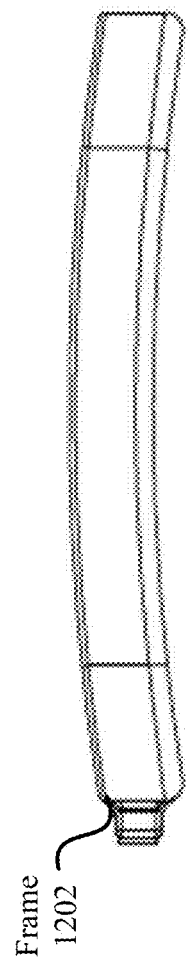

The chassis 2200 is formed of a dielectric material (e.g., ceramic and/or plastic) and/or a metal material (e.g., aluminum or magnesium). The chassis 2200 can include, but is not limited to, a container 2400 with a lid 2402 coupled thereto via one or more coupling mechanisms 2202 (e.g., screws). The container 2400 is coupled to the frame 1202 via one or more coupling mechanisms. The coupling mechanisms can include, but are not limited to, a rail mounting system. In some scenarios, the rail mounting system includes channels 1210 and concave depressions 1400 formed in the channels of the frame 1202, as well as convex protrusions 2300 formed on bottom surfaces 2302 of engagement structures 2404 of the chassis 2200. The engagement structures 2404 are sized and shaped to slide within the channel 1210. One or more ball bearings (not shown) or other mechanism can be provided with the engagement structures 2404 to assist with the sliding of the radio module 1500 into the insert space 1216 of the frame 1202. As such, the radio module 1500 is coupled to the frame 1202 by: aligning the engagement structures 2404 of the radio module 1500 with the channels 1210 of the frame 1202 (as shown in FIG. 15); sliding the engagement structures 2404 through the channels 1210 in a direction 1502 towards the electronics 1402 of the communication device 1200 as shown in FIGS. 15-17; and causing the convex protrusions 2300 of the radio module 1500 to engage the concave depressions 1400 of the frame 1202. The detent mechanisms 1400, 2300 hold the radio module 1500 in a certain position relative to the frame 1202 until released. The present solution is not limited to the particulars of the rail mounting system. Any detent mechanism can be used herein without limitation. In some scenarios, the detents 1212 include a catch, a lever, a clamp or a pin instead of depressions/protrusions.

The frame 1202 provides protection to the radio module 1500 from damage due to impact with other objects. In this regard, the frame 1202 has a raised portion 1214 that at least partially surrounds the radio module 1500 when fully inserted into an insert space 1216. For example, in some scenarios, the raised portion 1214 surrounds three sides of the radio module 1500 as shown in FIG. 17. In effect, only the lid 2402 and one sidewall are exposed and/or accessible when the radio module 1500 is coupled to the frame 1202. Also, a top surface 1700 of the raised portion 1214 resides above or is aligned with a top surface 1702 of the chassis lid 2402. The chassis lid 2402 may be formed of a material which will not deform when impacted by an object.

Various electronics 1402 are housed within the raised portion 1214. In this regard, the raised portion 1214 comprises a removable cover 1504 and an internal cavity 1212 in which the electronics 1402 are disposed. The cover 1504 is removably coupled to the frame 1202 via one or more coupling mechanisms 1506 (e.g., screws).

The electronics 1402 include, but are not limited to, I/O adaptor circuit boards, sensor(s), and/or wireless connectivity components for external sensors (e.g., sensors 202 of FIG. 2). The I/O adaptor circuit boards facilitate the electronic connection of the radio module 1500 with I/O connectors 1306 which are accessible to a user of the communication device 1200. The I/O connectors 1306 are shown as being located on a single side of the communication device 1500. The present solution is not limited in this regard. The I/O connectors can reside on any side of the communication device 1500, and/or different sides of the communication device 1500. The I/O connectors include, but are not limited to, an audio connector, a data/control connector, and/or a power connector. These listed I/O connectors are known in the art, and can be of any type selected in accordance with a given application. In some scenarios, the audio connector is coupled to a cable for a handheld speaker and microphone. The power connector is either (1) connected to a power source external to the communication device 1200 and/or (2) provides a way to couple an integrated rechargeable battery 1308 of the communication device 1200 to a charging unit. The rechargeable battery 1308 can reside in a recess 1310 formed in the frame 1202.

Notably, two recesses 1310, 1312 are provided in the frame 1202. A power source (e.g., a rechargeable battery 1308) can be inserted into one or both of these recesses. If a power source is not inserted into the recesses, then the sidewalls 1314, 1316 of the recesses provide handles for gripping the communication device 1200. In this regard, the recess structures have a dual purpose of (1) providing handles and (2) providing a space for housing power sources or other electronic components.

Antenna connectors 1302, 1304 are also provided with the frame 1202. The antenna connectors 1302, 1304 provide a means to connect antennas (not shown in FIGS. 12-21) to the radio module 1500. Antennas are well known in the art, and therefore will not be described herein. Any antenna can be used in accordance with a particular application.

A plurality of channels 1210 are formed on one or both sides of the frame 1202. In all scenarios, the channels 1210 are at least formed on the same side of the frame 1202 as the raised portion 1214. The channels 1210 have the following purposes: (1) to provide guides to direct the radio module 1500 to the rail mounting system during installation; (2) to maintain an alignment of the radio module 1500 with the frame 1202 throughout use of the communication device 1200, and/or (2) to dissipate heat produced by the radio module 1500. In this regard, the channels extend under the radio module 1500 and travel towards the edge of the frame 1202. Although two linear channels 1210 are shown in FIGS. 12-21, the present solution is not limited in this regard. Any number of channels with a variety of shapes can be provided in accordance with a particular application. Also, the channels 1210 need not extend parallel to each other. For example, in other scenarios, at least two channels extend perpendicular to each other. Alternatively, the channels comprise concentric circles.

Figure 25:
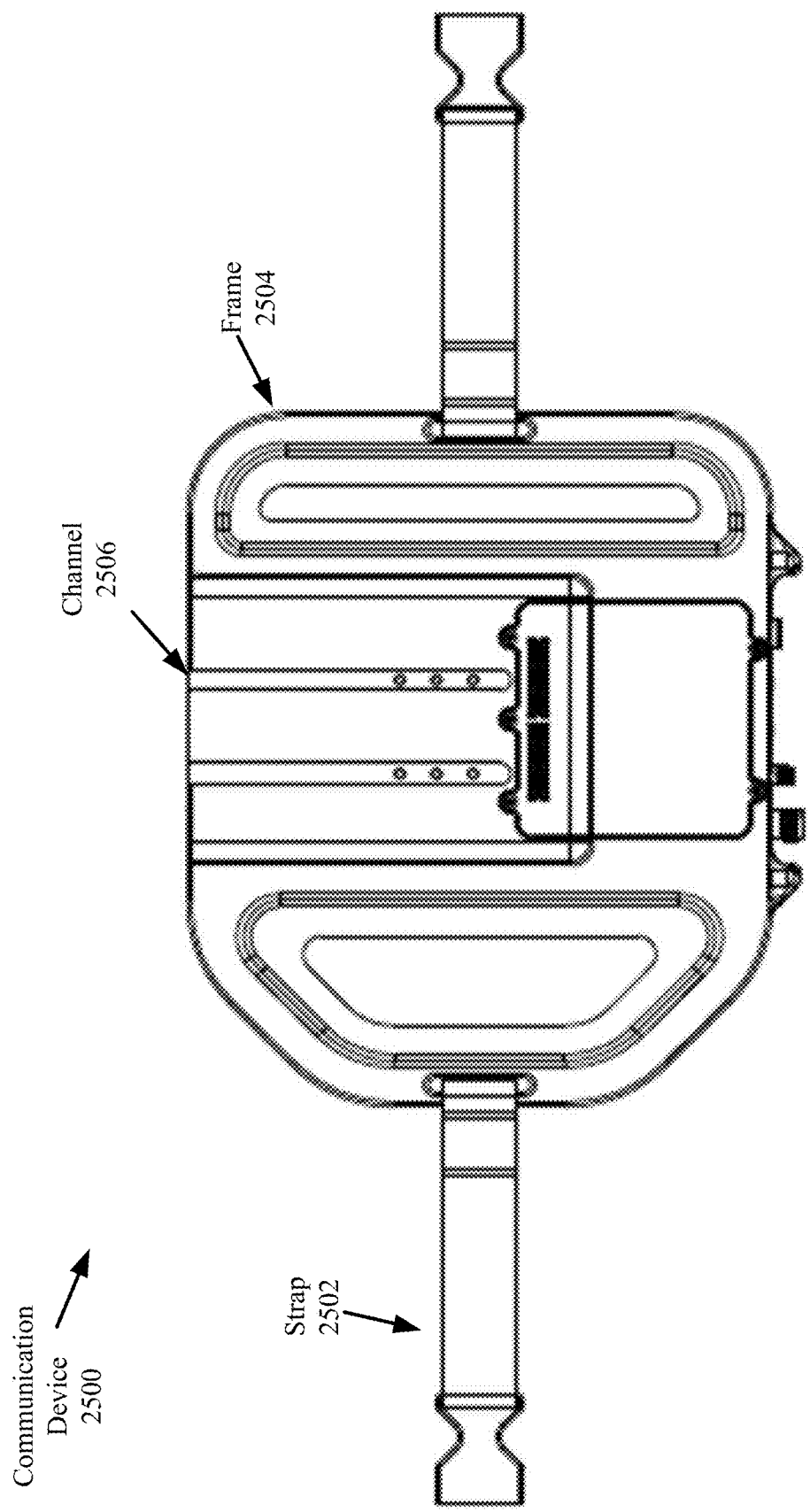
FIG. 25 is a top view of another illustrative communication device comprising a strap.

Referring now to FIG. 25, there is provided an illustration of another illustrative communication device 2500. Communication device 2500 is substantially similar to communication device 1200. As such, the above discussion of communication device 1200 is sufficient for understanding communication device 2500. One difference between these communication devices is the inclusion of straps 2502 with the communication device 2500. The straps 2502 provide a means to mechanically couple the communication device 2500 to an item (e.g., vest 300 of FIG. 3 and/or trauma plate).

Figure 26:
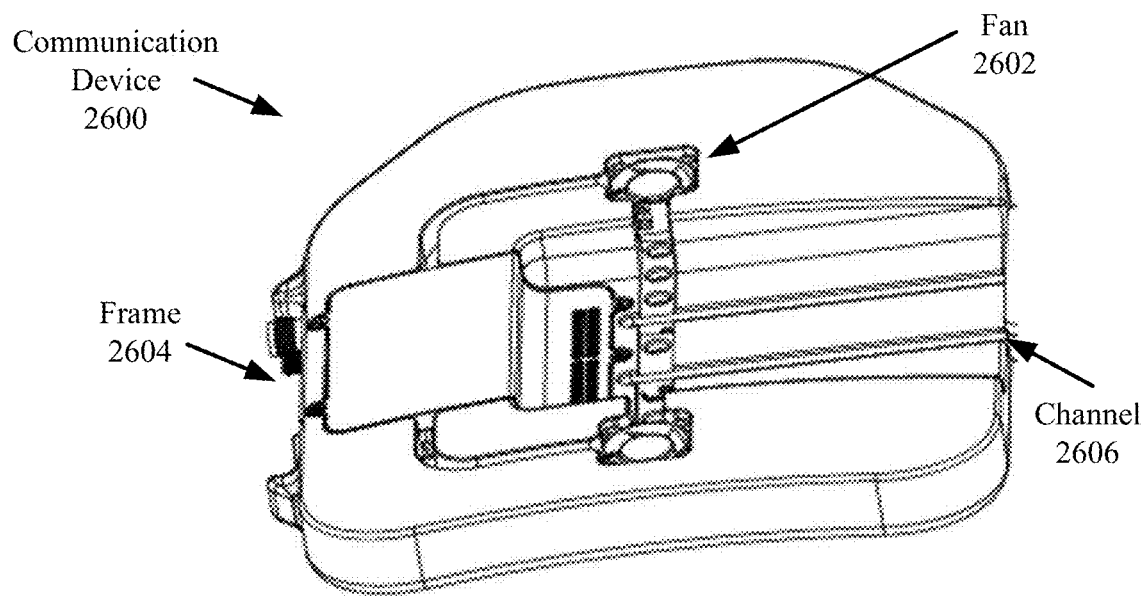
FIG. 26 is a front perspective view of another illustrative communication device comprising fans.
Figure 27:
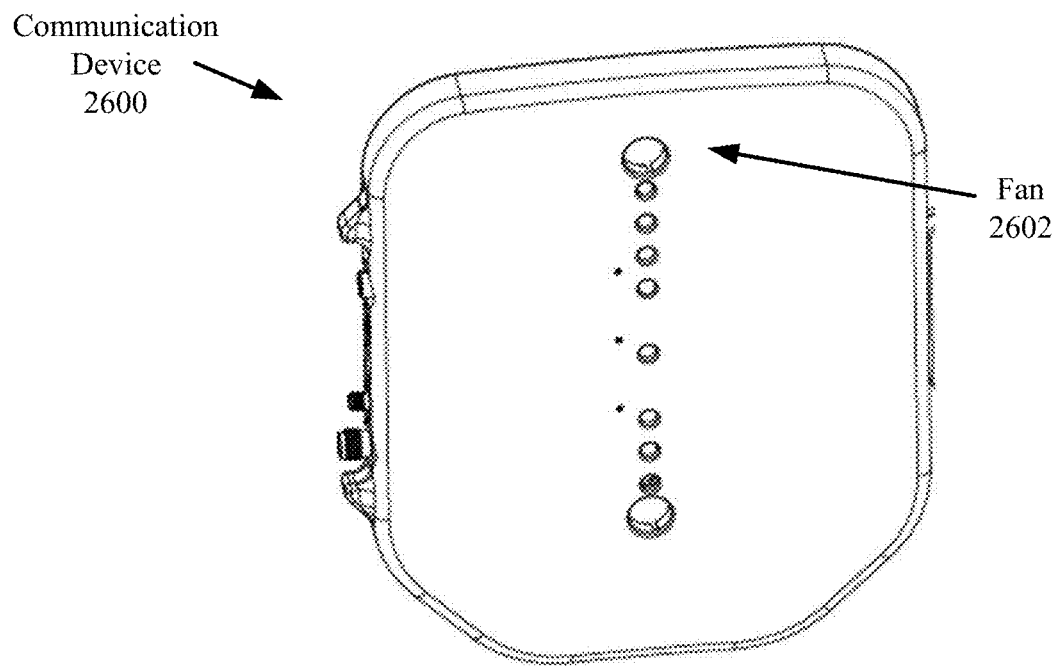
FIG. 27 is a bottom perspective view of the communication device shown in FIG. 26.
Figure 28:
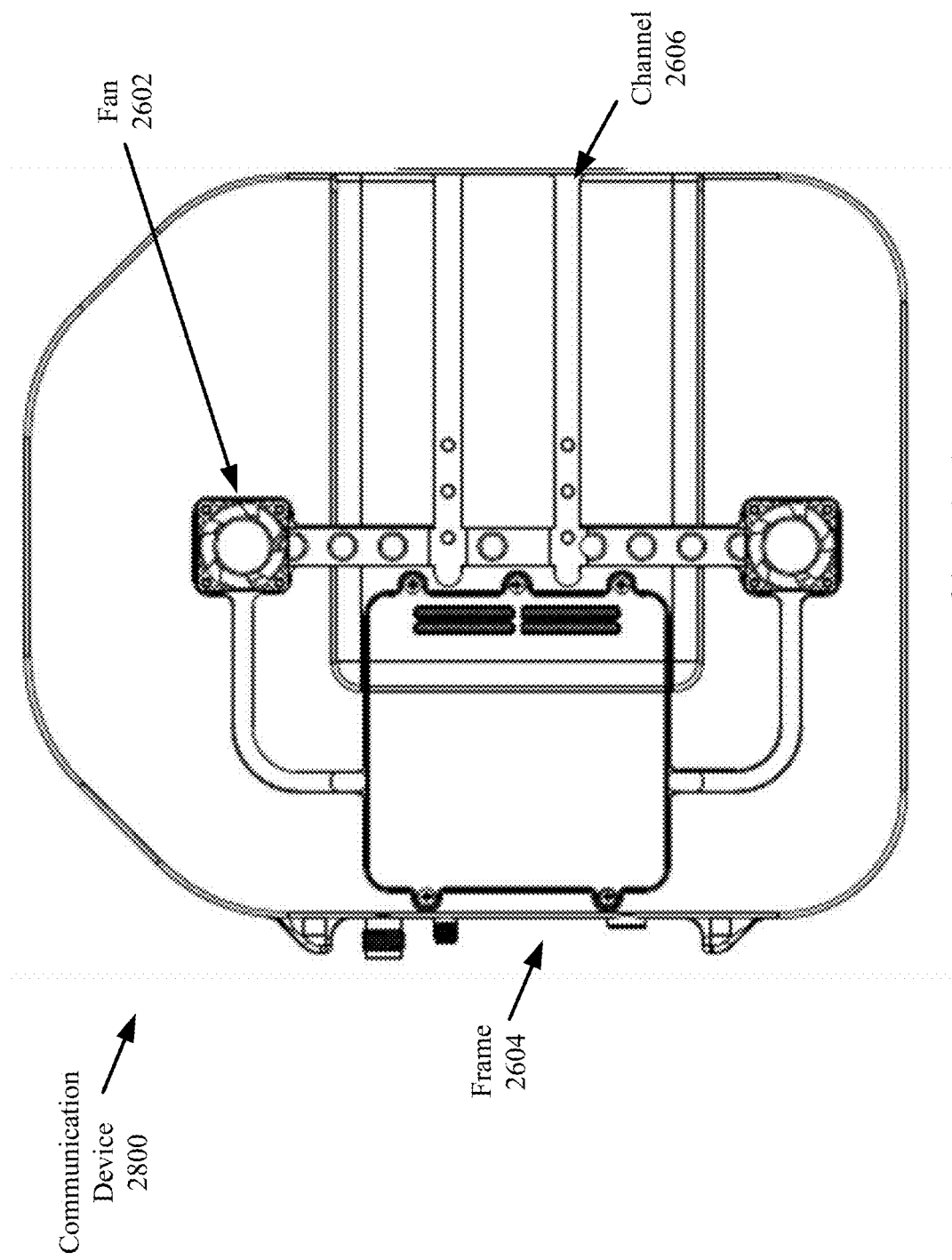
FIG. 28 is a top view of the communication device shown in FIGS. 26-27.

Referring now to FIGS. 26-28, there is provided an illustration of another illustrative communication device 2600. Communication device 2600 is substantially similar to communication device 1200. As such, the above discussion of communication device 1200 is sufficient for understanding communication device 2600. One difference between these communication devices is the inclusion of fans 2602 with the communication device 2600. The fans 2602 facilitate the cooling of the radio module (e.g., radio module 1500 of FIGS. 22-24) during operation thereof and/or the prevention of heat transfer from the communication devices to the wearer.

As noted above, the present solution can also be used with trauma plates provided to protect the sides of a wearer, i.e., side panel trauma plates inserted into storage slots 310 formed in side portions (e.g., side portions 306 of FIG. 3) of a vest (e.g., vest 300 of FIG. 3). An illustrative communication device 2900 having a frame 2902 with a cross-sectional profile that matches the cross-sectional profile of a side panel trauma plate by a certain amount (e.g., 75-100%) is provided in FIGS. 29-30. In this present scenario, the cross-sectional profile of the frame 2902 matches that of a trauma plate except for a space 2904 formed in a bottom section thereof.

Figure 4:
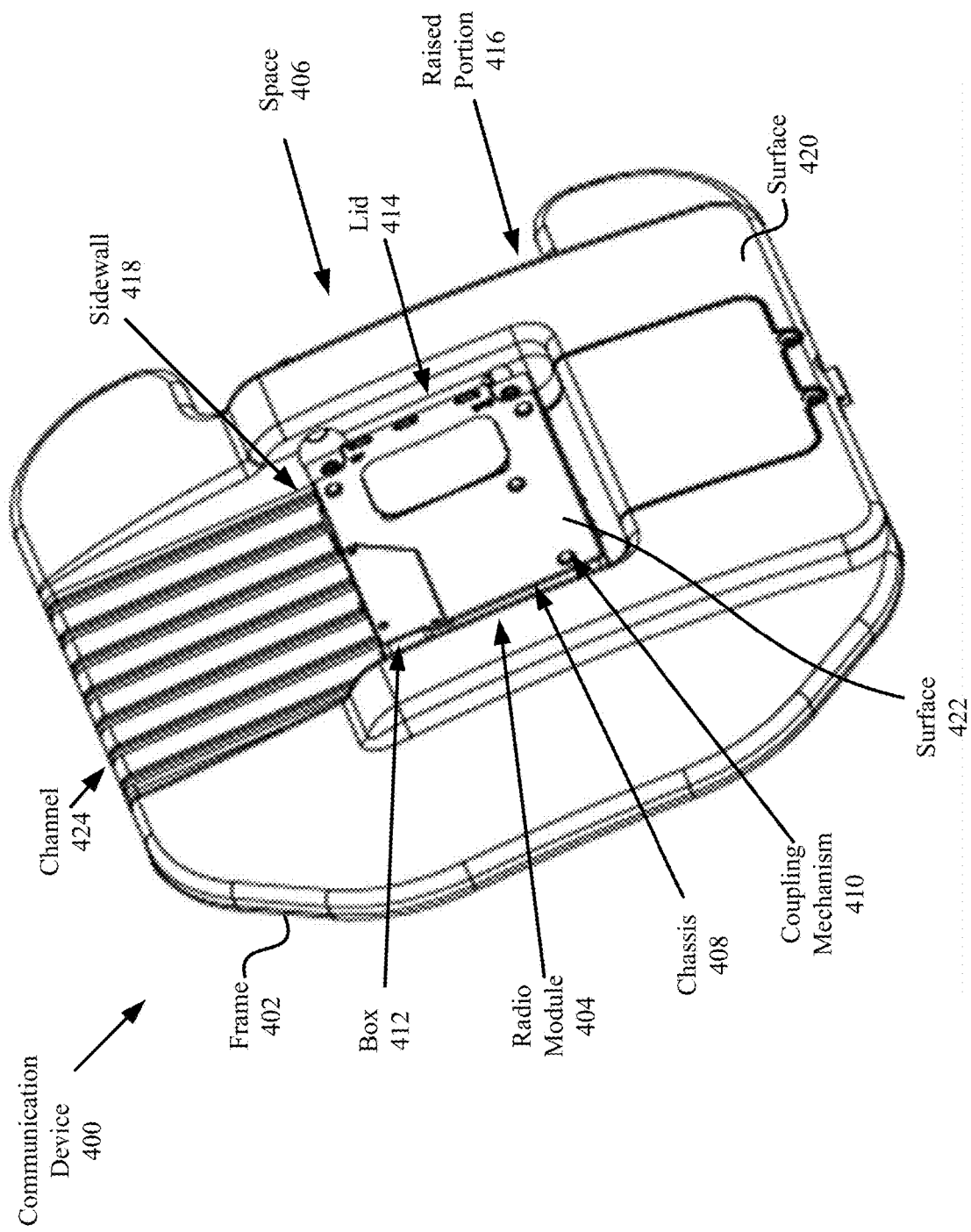
FIG. 4 is a front perspective view of an illustrative communication device that can be inserted into a front or back side plate space of the vest show in FIG. 3.
Figure 5:
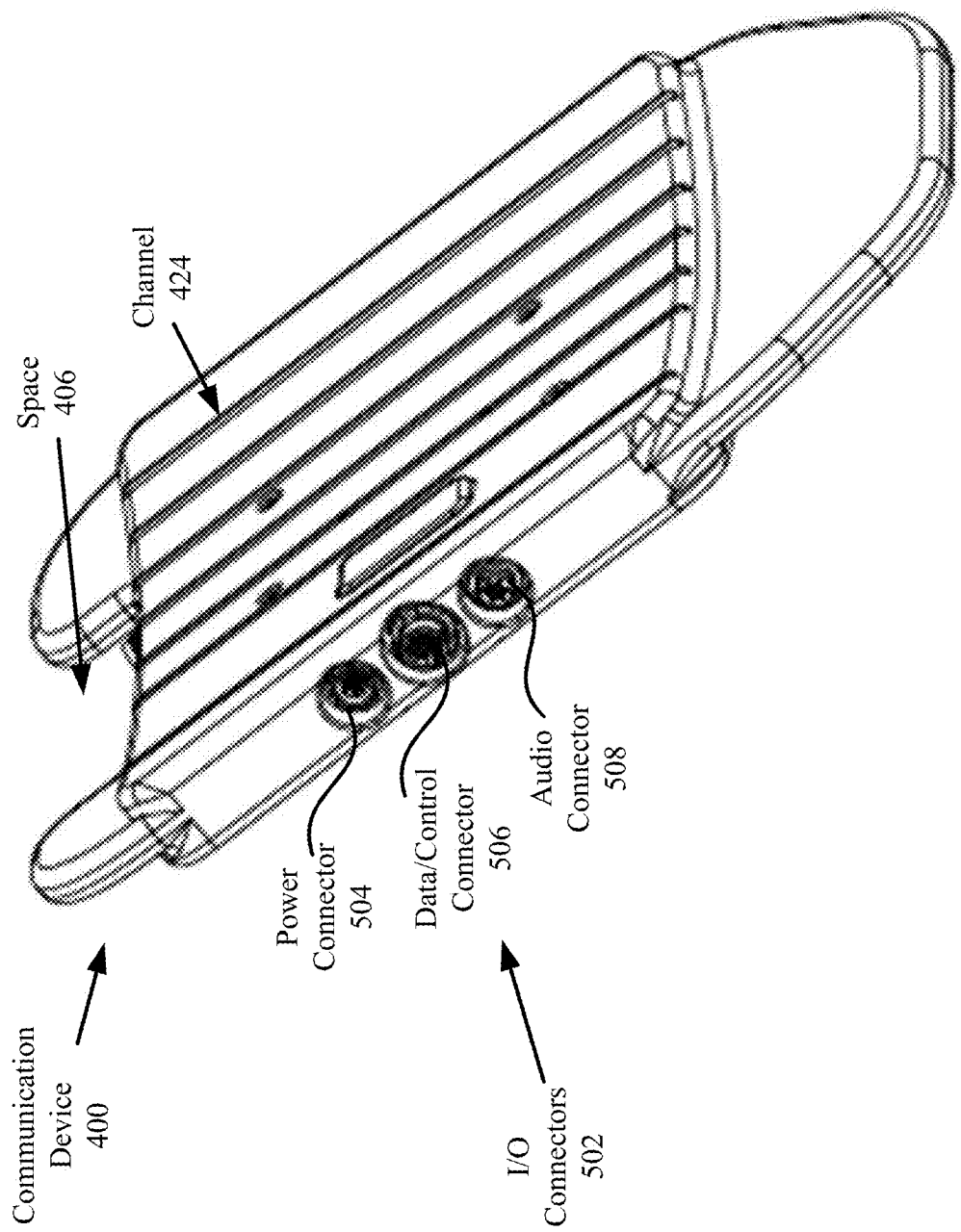
FIG. 5 is a back perspective view of the communication device shown in FIG. 4.
Figure 6:
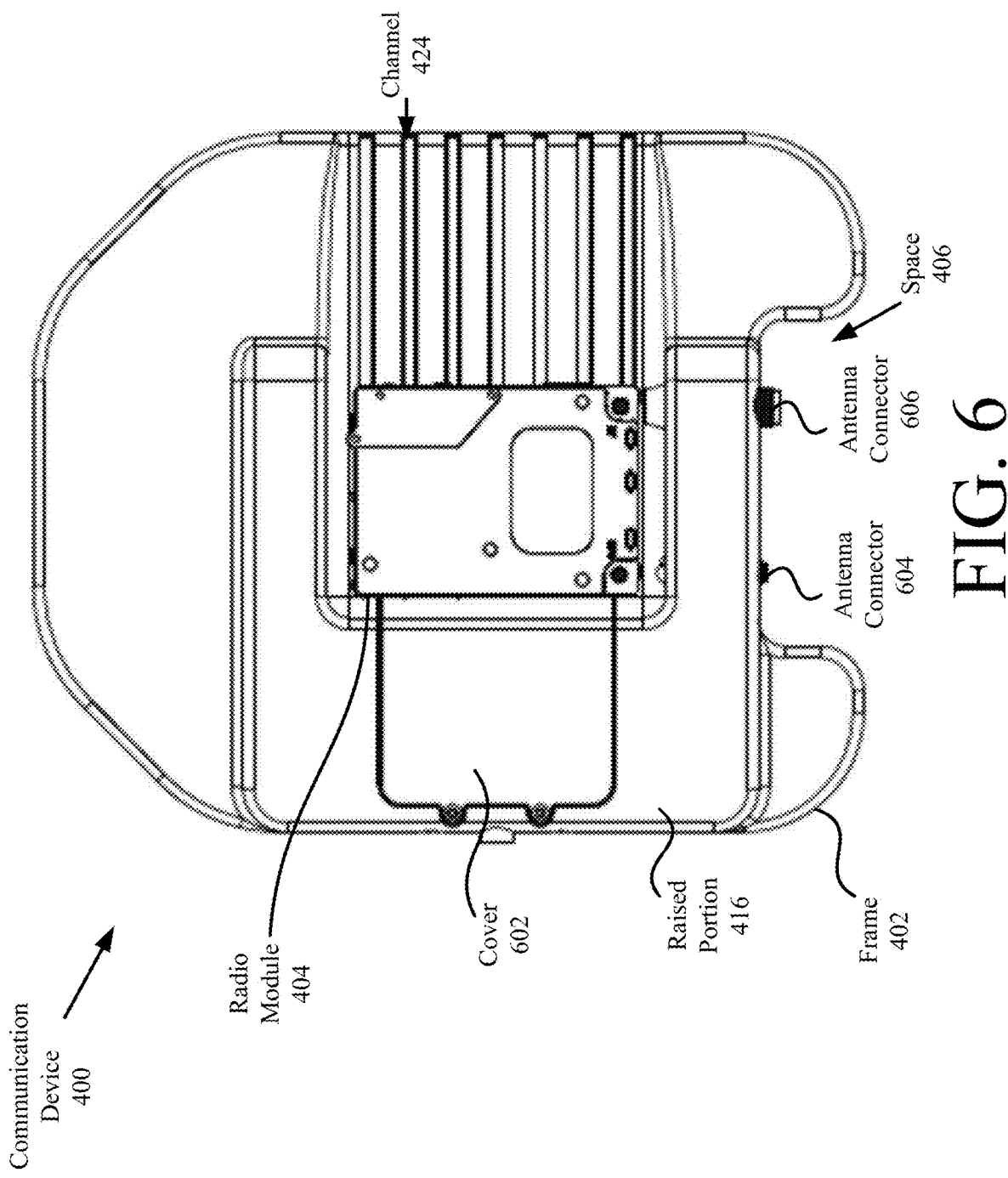
FIG. 6 is a top view of the communication device shown in FIG. 4.
Figure 7:
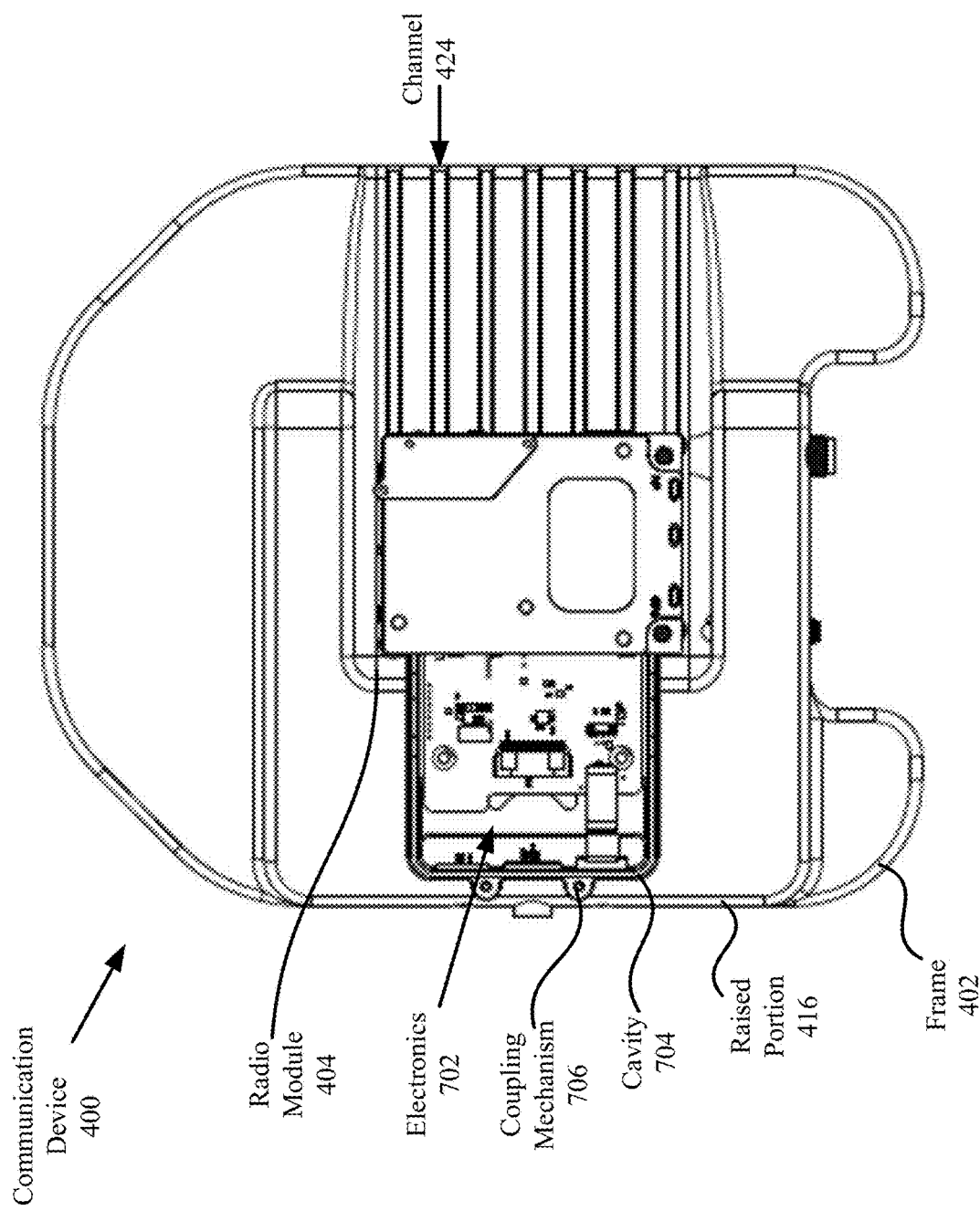
FIG. 7 is a top view of the communication device shown in FIG. 4 with a cover removed therefrom.
Figure 8:
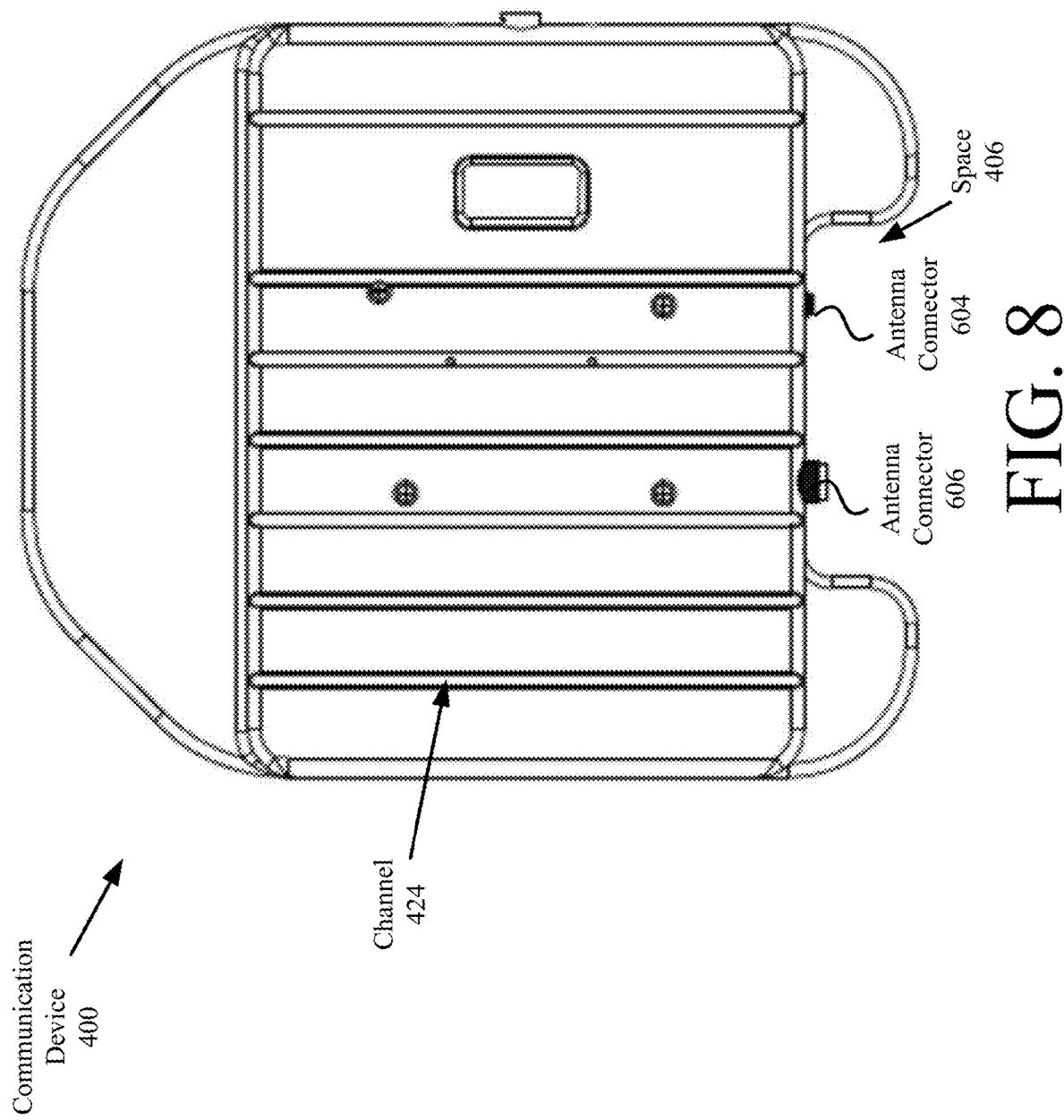
FIG. 8 is a bottom view of the communication device shown in FIG. 4.
Figure 9:
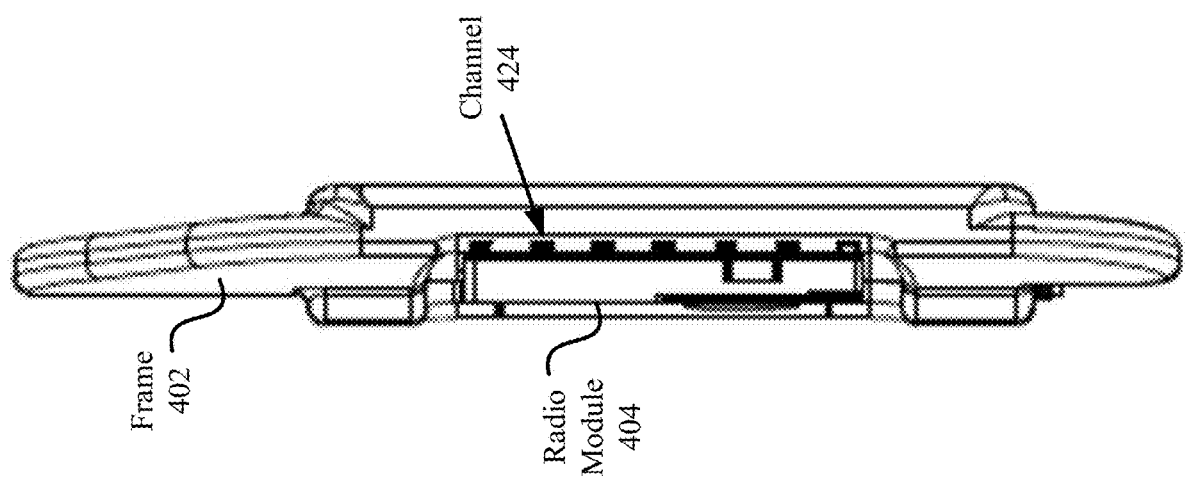
FIGS. 9-11 each provide a side view of the communication device shown in FIG. 4.
Figure 10:
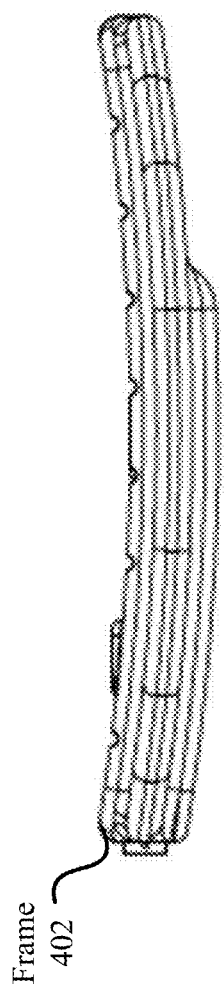
Figure 11:
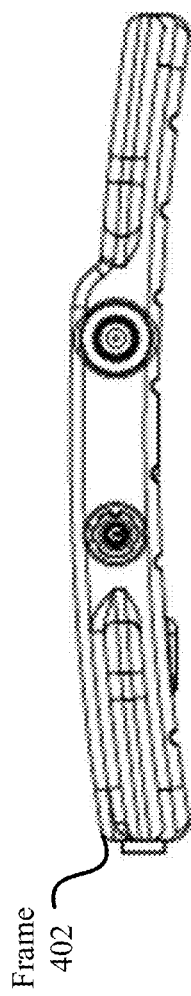
Figure 12:
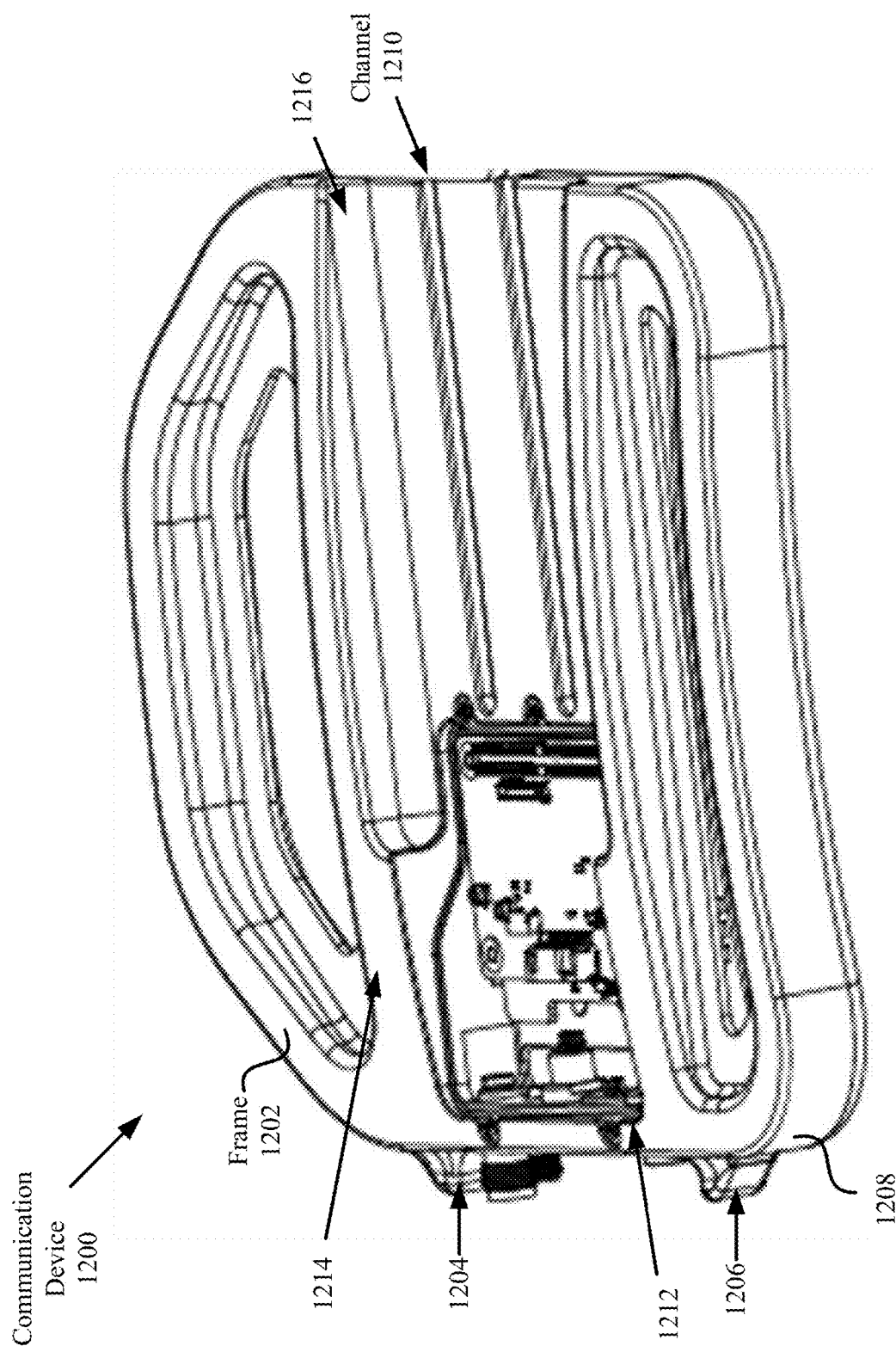
FIG. 12 is front perspective view of another illustrative communication device (with the cover removed therefrom) that can be inserted into a front or back side plate space of the vest show in FIG. 3.
Figure 13:
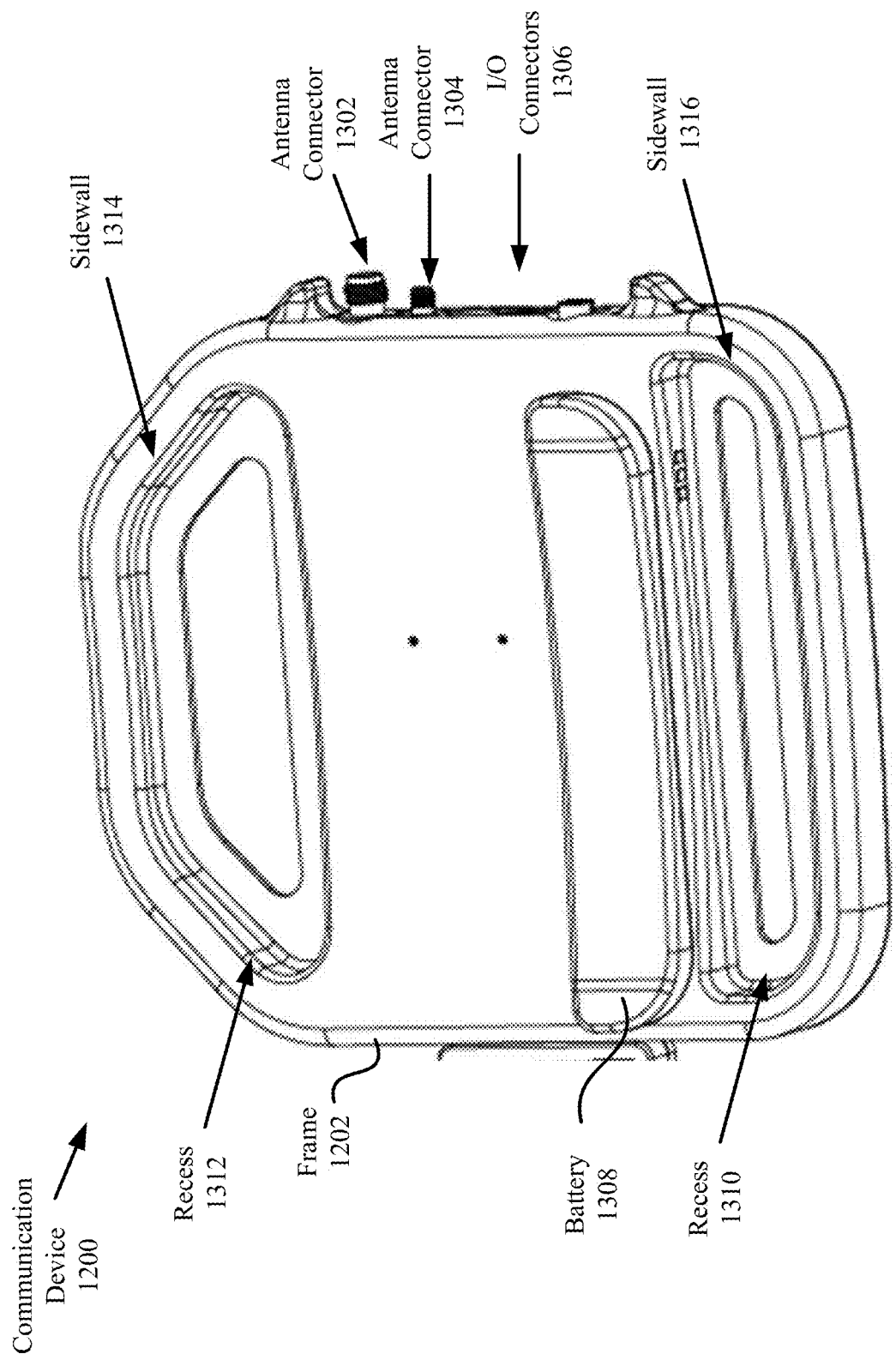
FIG. 13 is a back perspective view of the communication device shown in FIG. 12.
Figure 14:
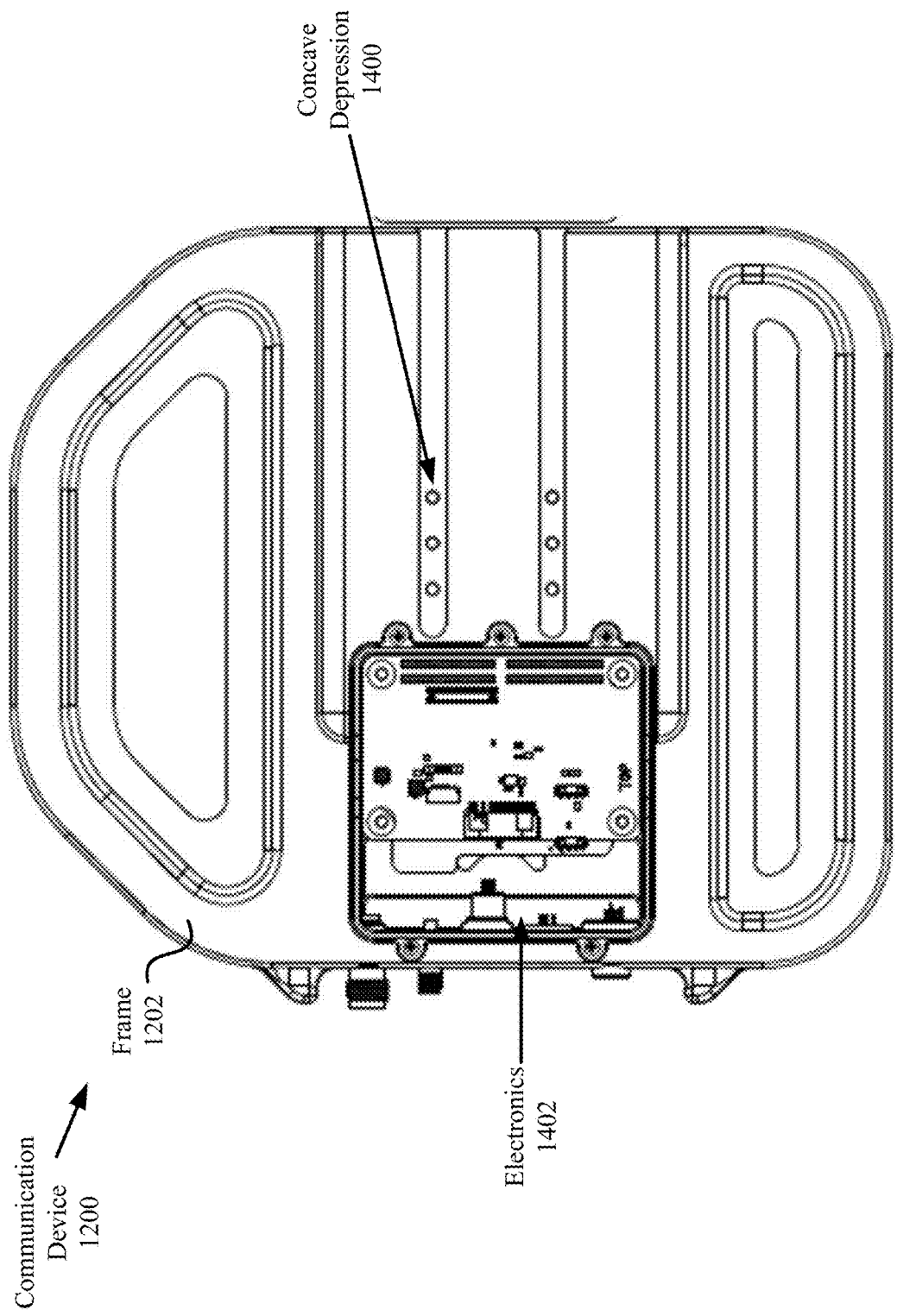
FIG. 14 is top view of the communication device shown in FIG. 12 with the cover removed therefrom.
Figure 29:
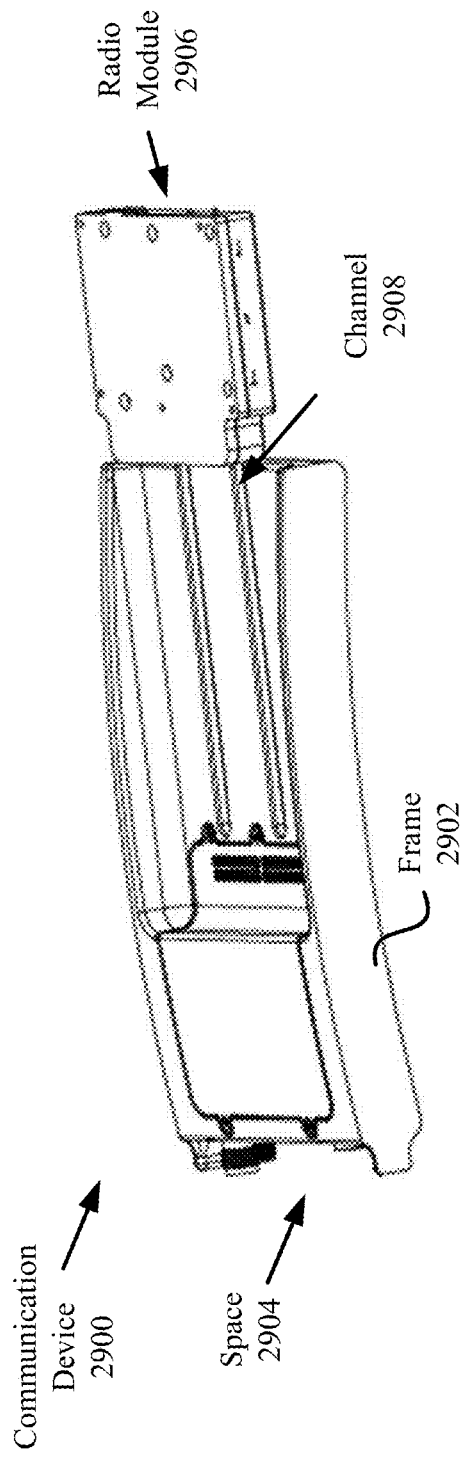
FIG. 29 is a top perspective view of another communication device for a side plate space of the vest shown in FIG. 3, with a radio module removed therefrom.
Figure 30:
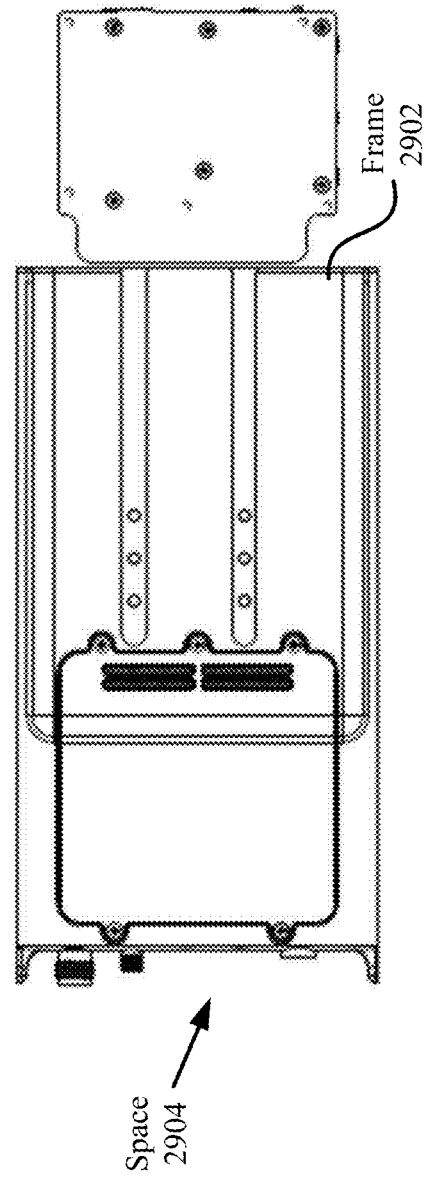
FIG. 30 is a top view of the communication device shown in FIG. 29, with the radio module removed therefrom.

Referring now to FIG. 31, there is provided a flow diagram of an illustrative method for using/operating a communication device (e.g., communication device 400 of FIG. 4, 1200 of FIG. 12, 2500 of FIG. 25, 2600 of FIG. 26 or 2900 of FIG. 29). Method 3100 begins with 3102 and continues with 3104 where a radio module (e.g., radio module 404 of FIGS. 4-11, 1500 of FIG. 12-24, or 2906 of FIGS. 29-30) is installed or integrated in/with a frame (e.g., frame 402 of FIGS. 4-11, 1202 of FIGS. 12-21, 2504 of FIG. 25, 2604 of FIGS. 26-28, 2902 of FIGS. 29-30) of the communication device. The frame has a cross-sectional profile that matches a cross-sectional profile of a trauma plate by a given amount (e.g., 75-100%).

In a next optional 3106, at least one channel (e.g., channel 424 of FIGS. 4-11, 1210 of FIGS. 12-21, 2506 of FIG. 25, 2606 of FIG. 26-28, or 2908 of FIGS. 29-30) formed in the frame is used to guide the radio module towards a coupling mechanism (e.g., concave depressions 1400 of FIG. 14) during the installation or integration. Also during the installation or integration, the following electrical connections are established as shown by 3108: a) between the radio module and an Input/Output adaptor circuit board (e.g., electronics 702 of FIG. 7 or 1402 of FIG. 14) disposed in the frame and/or (b) between the radio module and at least one antenna connector (e.g., antenna connector(s) 604, 606 of FIG. 6, or 1302, 1304 of FIG. 13) integrated with the frame.

Upon completing 1308, method 1300 continues with optional 3110 or 3112. 3110 involves using at least one recess (e.g., recess 1310 and/or 1312 of FIG. 13) formed in the frame (a) as a handle during a first time period and (b) to house an electronic component (e.g., a battery 1308 of FIG. 13) during a second period of time different than the first period of time.

In 3112, the communication device is concealed in a ballistic wearable item (e.g., ballistic vest 300 of FIG. 3) such that the communication device resides in a storage slot (e.g., storage slots 308, 310 of FIG. 3) for a trauma plate. At least one cable is also concealed in the ballistic wearable item as by 3114. Thereafter in 3116, the radio module performs communication operations.

In some scenarios, the communication device has a dual purpose of (a) providing protection to a wearer from blunt trauma resulting from an object's impact with the ballistic wearable item and (b) providing wireless communication capabilities to the wearer. Accordingly, the trauma plate may have been replaced by the communication device.

In other scenarios, the communication device resides in the storage slot adjacent to the trauma plate. Accordingly, the trauma plate is optionally used as an insulator for preventing a transfer of heat from the communication device to a wearer of the ballistic wearable item, as shown by 3118.

In 3120, the channels formed in the frame and/or fans (e.g., fans 2602 of FIGS. 26-28) integrated with the frame are used to dissipate heat generated by the communication device. At least one of the channels may optionally be used in 3122 to additionally maintain an alignment of the radio module with the frame throughout use of the ballistic wearable item.

In 3124, the frame is used to protect the radio module from damage due to impact with other objects. In this regard, the frame comprises a raised portion (e.g., raised portion 416 of FIG. 4, or 1214 of FIG. 12) that surround at least three sides of the radio module. The raised portion comprises a top surface that resides above or is aligned with a top surface of the radio module. Subsequently, 3126 is performed where method 3100 ends or other action/operations are performed.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for integrating a communication device with a wearable item configured to support a trauma plate on a person, comprising:
   disposing the trauma plate in a pocket of the wearable item;
   disposing the communication device in the pocket of the wearable item such that the communication device resides adjacent to the trauma plate, where the communication device comprises a radio module that is removably coupled to a frame;
   using the frame to maintain the radio module in a given position relative to the trauma plate while the communication device and trauma plate are both disposed within the pocket, where the frame is substantially coextensive lengthwise and height-wise with the trauma plate;
   performing communication operations by the radio module; and
   using at least one channel formed on an external surface of the frame and having a u-shaped cross-sectional profile, a closed end, an open end and an elongate open side that extends between the closed end and the open end to (i) facilitate a sliding engagement directly between the radio module and the external surface of the frame during assembly and disassembly of the communication device, (ii) maintain an alignment of the radio module with the frame throughout use of the wearable item, and (iii) dissipate heat generated by the radio module while performing the communication operations.

2. The method according to claim 1, wherein the wearable item is a vest.

3. The method according to claim 1, wherein the frame is coextensive lengthwise and height-wise with the trauma plate by an amount of 75-100%.

4. The method according to claim 1, further comprising concealing at least one cable for the communication device in the wearable item.

5. The method according to claim 1, wherein the communication device has a dual purpose of (a) providing protection to the person from blunt trauma resulting from an object's impact with the wearable item and (b) providing wireless communication capabilities to the person.

6. The method according to claim 1, further comprising using the trauma plate as an insulator for preventing a transfer of heat from the communication device to the person.

7. The method according to claim 1, wherein the at least one channel formed in the frame extends from a first side of the frame to a second opposing side of the frame.

8. The method according to claim 1, wherein the at least one channel of the frame at least partially extends under the radio module.

9. The method according to claim 1, wherein using the at least one channel to additionally guide the radio module towards a coupling mechanism during installation or integration with the frame.

10. The method according to claim 9, wherein the coupling mechanism comprises convex protrusions formed on a surface of the radio module which engage concave depressions formed in the at least one channel.

11. The method according to claim 1, further comprising using the frame to protect the radio module from damage due to impact with other objects.

12. The method according to claim 11, wherein the frame comprises a raised portion that surrounds at least three sides of the radio module.

13. The method according to claim 12, wherein the raised portion comprises a top surface that resides above or is aligned with a top surface of the radio module.

14. The method according to claim 1, further comprising establishing an electrical connection between the radio module and an Input/Output adaptor circuit board disposed in the frame.

15. The method according to claim 1, further comprising establishing an electrical connection between the radio module and at least one antenna connector integrated with the frame.

16. The method according to claim 1, further comprising using at least one recess formed in the frame (a) as a handle during a first time period and (b) to house an electronic component during a second period of time different than the first period of time.

17. The method according to claim 16, wherein the electronic component is a battery.

18. The method according to claim 1, further comprising using at least one fan integrated with the frame to prevent heat transfer from the communication device to the person.

19. The integration system according to claim 1, wherein the portions of the rigid frame surround the radio module recess on three sides thereof.

20. The integration system according to claim 19, wherein the portions of the rigid frame which surround the radio module are raised with respect to a major side of the rigid frame.

21. The integration system according to claim 1, further comprising at least one I/O adaptor configured to facilitate electronic connection between an electrical connector of the radio module, when removably installed within the integration system, and one or more I/O electrical connectors of the integration system which are accessible to a user.

22. The integration system according to claim 21, wherein the I/O electrical connectors are configured to facilitate connections to one or more of an audio circuit, a data/control circuit, a power supply circuit, and an antenna circuit.

23. The integration system according to claim 1, wherein the guide structure is comprised with one or more channels which are configured to receive engagement structure disposed on the radio module when the radio module is removably disposed in the integration system.

24. The integration system according to claim 1, further comprising an internal cavity in which a power supply circuit is disposed for providing power to the radio module when installed in the integration system.

25. The integration system according to claim 1, wherein the rigid frame is comprised of a plurality of channels which are configured to receive engagement structure of the radio module and dissipate heat generated by the radio module when installed in the integration system.

26. A communication device, comprising:
a frame sized and shaped (i) to be received in a pocket of a wearable item configured to support a trauma plate on a person and (ii) to be coextensive with the trauma plate when received in the pocket; and
a radio module that is configured to perform communication operations and that is coupled to the frame such that the radio module is maintained in a given position relative to the trauma plate while the communication device and trauma plate are both disposed in the pocket;
wherein at least one channel
is formed on an external surface of the frame,
has a u-shaped cross-sectional profile, a closed end, an open end and an elongate open side that extends between the closed end and the open end, and
is configured to facilitate a sliding engagement directly between the radio module and the external surface of the frame during assembly and disassembly of the communication device, maintain an alignment of the radio module with the frame throughout use of the wearable item, and dissipate heat generated by the radio module while performing the communication operations.

27. The communication device according to claim 26, wherein the communication device is concealed within the wearable item.

28. The communication device according to claim 26, wherein the frame is coextensive lengthwise and height-wise with the trauma plate by an amount of 75-100%.

29. The communication device according to claim 26, wherein the communication device has a dual purpose of (a) providing protection to the person from blunt trauma resulting from an object's impact with the wearable item and (b) providing wireless communication capabilities to the person.

30. The communication device according to claim 26, wherein the trauma plate is configured to act as an insulator for preventing a transfer of heat from the communication device to the person.

31. The communication device according to claim 26, wherein the at least one channel formed in the frame extends from a first side of the frame to a second opposing side of the frame.

32. The communication device according to claim 26, wherein the at least one channel of the frame extends under the radio module and travels to an edge of the frame.

33. The communication device according to claim 31, wherein the at least one channel is additionally configured to guide the radio module towards a coupling mechanism during installation or integration in/with the frame.

34. The communication device according to claim 26, wherein the coupling mechanism comprises convex protrusions formed on a surface of the radio module which engage concave depressions formed in the at least one channel.

35. The communication device according to claim 26, wherein the frame is configured to protect the radio module from damage due to impact with other objects.

36. The communication device according to claim 35, wherein the frame comprises a raised portion that surrounds at least three sides of the radio module.

37. The communication device according to claim 36, wherein the raised portion comprises a top surface that resides above or is aligned with a top surface of the radio module.

38. The communication device according to claim 26, further comprising an Input/Output adaptor circuit board that is disposed in the frame and electrically connected to the radio module.

39. The communication device according to claim 26, further comprising at least one antenna connector that is integrated with the frame and electrically connected to the radio module.

40. The communication device according to claim 26, further comprising at least one recess formed in the frame that (a) provides a handle during a first time period and (b) houses an electronic component during a second period of time different than the first period of time.

41. The communication device according to claim 40, wherein the electronic component is a battery.

42. The communication device according to claim 26, further comprising at least one fan integrated with the frame and configured to prevent heat transfer from the communication device to the person.

43. A wearable item, comprising:
a storage slot;
a trauma plate disposed in the storage slot and configured to absorb a ballistic impact of projectiles received by the wearable item;
a communication device external to the trauma plate and disposed in the storage slot so as to reside adjacent to and be in direct contact with the trauma plate, the communication device comprising
a frame coextensive with the trauma plate, and
a radio module coupled to the frame that is configured to perform wireless communication operations;
wherein the trauma plate is disposed in the storage slot such that the trauma plate will reside between a person wearing the wearable item and the communication device, and the trauma plate is configured to act as an insulator to prevent a transfer of heat from the communication device to the person when the person is wearing the wearable item; and
wherein at least one channel (1) is formed on an external surface of the frame, (2) has a u-shaped cross-sectional profile, a closed end, an open end and an elongate open side that extends between the closed end and the open end, (3) is configured to facilitate a sliding engagement directly between the radio module and the frame during assembly and disassembly of the communication device, (4) is configured to maintain an alignment of the radio module with the frame throughout use of the wearable item, and (5) is configured to dissipate heat generated by the radio module while performing the wireless communication operations.

44. A method for integrating a communication device with a wearable item configured to support a trauma plate on a person, comprising:
assembling the communication device by slidingly receiving at least a portion of a radio module in at one channel formed in an external surface of a frame, the at least one channel having a u-shaped cross-sectional profile, a closed end, an open end and an elongate open side that extends between the closed end and the open end;
disposing the trauma plate in a pocket of the wearable item, the trauma plate being configured to absorb a ballistic impact of projectiles received by the wearable item;
disposing the communication device in the pocket of the wearable item such that the communication device resides external to and adjacent to the trauma plate, where the radio module that is removably coupled to the frame and configured to perform wireless communication operations; and
using the frame to maintain the radio module in a given position relative to the trauma plate while the communication device and trauma plate are both disposed within the pocket, where the frame is substantially coextensive lengthwise and height-wise with the trauma plate.

45. An integration system which supports retention and operations of a removable communications transceiver when disposed in a trauma plate retention slot (TPRS) of a plate carrier vest, comprising:
a rigid frame having a profile shape conformed to a profile shape of a trauma plate which can be received in the TPRS, and being at least 75% of the size of the trauma plate,
the rigid frame configured to fit within the TPRS adjacent to a major surface of a trauma plate separate from the rigid frame, when the trauma plate is disposed in the TPRS;
a radio module recess formed in the rigid frame configured to removably retain a radio module therein when the integration system is disposed in the TPRS, the radio module recess defined by portions of the rigid frame which are arranged to partially surround the radio module when received in the radio module recess;
one or more electrical connectors disposed on the integration system which mediate one or more electrical connections to the radio module through the integration system when the radio module is removably retained therein;
a guide structure integrated with the rigid frame configured to align the radio module in the radio module recess when the radio module is removably inserted in the radio module recess.

* * * * *